United States Patent
Fadell

(10) Patent No.: US 8,854,966 B2
(45) Date of Patent: Oct. 7, 2014

(54) APPARATUS AND METHODS FOR NETWORK RESOURCE ALLOCATION

(75) Inventor: Anthony M. Fadell, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 1556 days.

(21) Appl. No.: 12/008,623

(22) Filed: Jan. 10, 2008

(65) Prior Publication Data

US 2009/0180430 A1    Jul. 16, 2009

(51) Int. Cl.

| H04W 72/04 | (2009.01) |
|---|---|
| H04L 12/54 | (2013.01) |
| H04L 12/801 | (2013.01) |
| H04L 12/923 | (2013.01) |
| H04L 12/927 | (2013.01) |
| H04L 12/911 | (2013.01) |
| H04W 28/26 | (2009.01) |

(52) U.S. Cl.
CPC ....... *H04L 12/5695* (2013.01); *H04W 72/0426* (2013.01); *H04L 47/10* (2013.01); *H04L 47/762* (2013.01); *H04L 47/803* (2013.01); *H04L 47/808* (2013.01); *H04L 47/824* (2013.01); *H04W 28/26* (2013.01); *H04W 72/0453* (2013.01)
USPC . 370/235; 370/232; 370/395.21; 370/395.41; 709/233

(58) Field of Classification Search
USPC ........... 370/230, 230.1, 232–235, 252, 395.2, 370/395.21, 395.4, 395.41, 395.42, 395.43, 370/468; 709/224–226, 232–235
See application file for complete search history.

(56) References Cited

U.S. PATENT DOCUMENTS

| 6,771,661 | B1 | 8/2004 | Chawla et al. | |
|---|---|---|---|---|
| 7,002,971 | B1 | 2/2006 | Enns et al. | |
| 7,054,327 | B2 | 5/2006 | Hagirahim et al. | |
| 7,168,044 | B1 * | 1/2007 | Mao ............................ | 715/736 |
| 7,254,628 | B2 | 8/2007 | Koops et al. | |
| 7,260,635 | B2 | 8/2007 | Pandya et al. | |
| 7,274,700 | B2 | 9/2007 | Jin et al. | |

(Continued)

FOREIGN PATENT DOCUMENTS

EP    1 367 783    12/2003

OTHER PUBLICATIONS

Kaaranen et al., UMTS Networks, 2005, John Wiley & Sons, Ltd., p. 59-98.*

(Continued)

*Primary Examiner* — Hoon J Chung
(74) *Attorney, Agent, or Firm* — Womble Carlyle Sandridge & Rice LLP

(57) ABSTRACT

Methods and apparatus for allocating resources (such as communications bandwidth) using a network access device. In one embodiment, the network includes a wireless network (e.g., WiFi), and the access device includes a wireless router or gateway in communication with a plurality of wireless users. The device includes an administrator function which allows the network administrator to implement one or more resource allocation policies or rules. Using this approach, resources such as bandwidth can be allocated based on any number of different parameters or use classifications, including for example: (i) public versus private use; (ii) security level; (iii) user range from the access device; (iv) type of PHY or air interface; (v) type of channel coding; (vi) air interface mode or application (e.g., data versus voice). In one variant, the allocation policies are manually controlled by the administrator. In another variant, substantially automatic resource allocation is performed by the administrator program.

34 Claims, 10 Drawing Sheets

(56) References Cited

U.S. PATENT DOCUMENTS

| | | | |
|---|---|---|---|
| 7,602,721 B1* | 10/2009 | Tangirala et al. | 370/235.1 |
| 7,852,759 B2* | 12/2010 | Stephenson et al. | 370/230 |
| 2004/0202121 A1 | 10/2004 | Yuang | |
| 2006/0020694 A1* | 1/2006 | Nag et al. | 709/223 |
| 2007/0159997 A1* | 7/2007 | Tsai et al. | 370/328 |
| 2007/0201540 A1* | 8/2007 | Berkman | 375/219 |
| 2007/0230335 A1 | 10/2007 | Sang et al. | |
| 2008/0117836 A1* | 5/2008 | Savoor et al. | 370/254 |
| 2008/0159212 A1* | 7/2008 | Zhang et al. | 370/329 |
| 2008/0192634 A1* | 8/2008 | Kumar et al. | 370/235 |
| 2008/0198824 A1* | 8/2008 | Wu et al. | 370/338 |

OTHER PUBLICATIONS howstuffworks, What does GSM mean in a cell phone?, Apr. 29, 2007, howstuffworks.*

Grabianowski et al., How WiMAX Works, Dec. 8, 2006, howstuffworks.*

Business Wire, Motorola Demonstrates Long Range GSM Capability—300% More Coverage With New Extended Cell, May 14, 1998, Business Wire.*

* cited by examiner

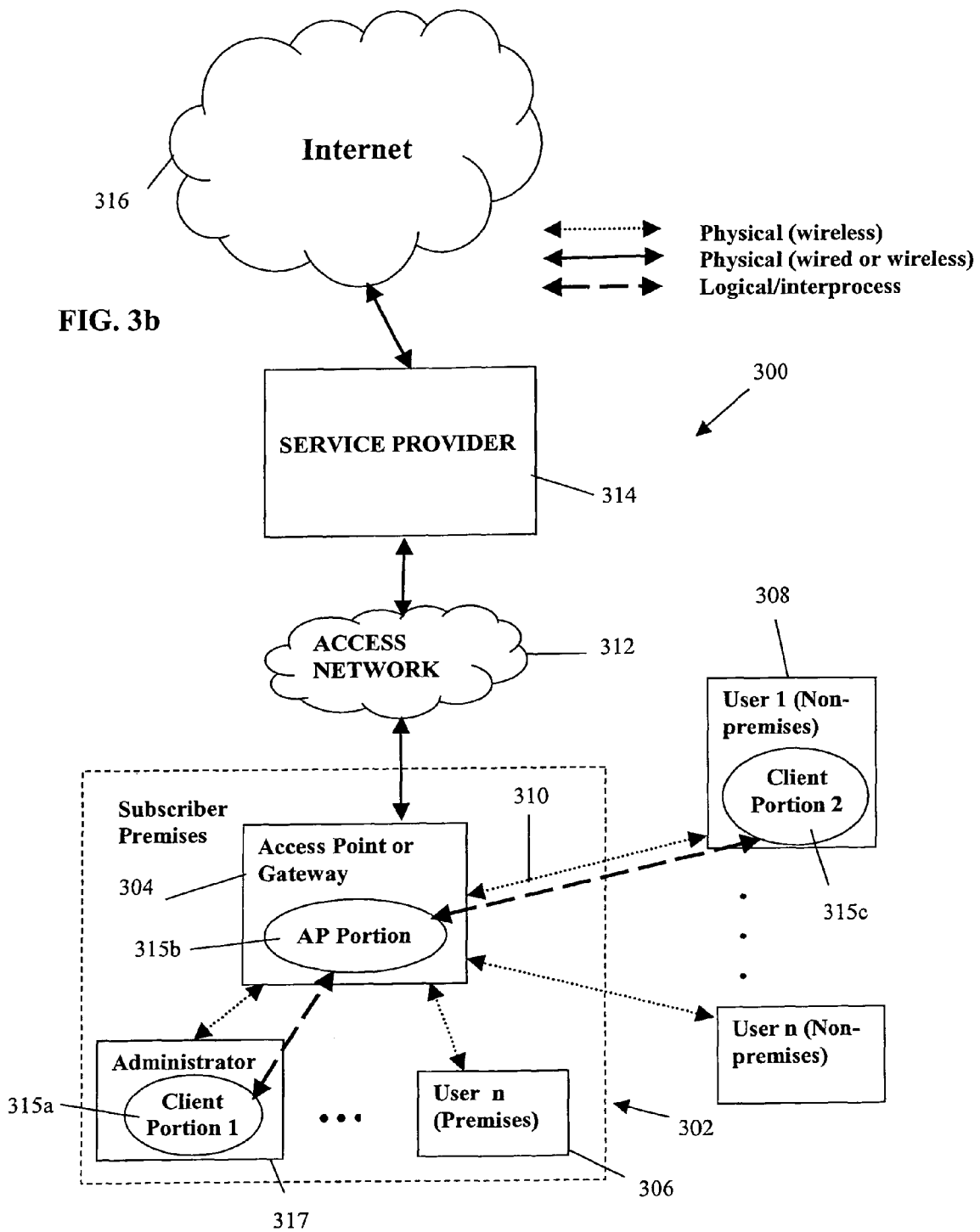

APPARATUS AND METHODS FOR NETWORK RESOURCE ALLOCATION

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of data networks. More particularly, in one exemplary aspect, the present invention is directed to a computer networking device (e.g., a router) which is adapted to allocate portions of a communications network or its available bandwidth between different uses.

2. Description of Related Technology

In a typical data network, a wired or wireless router with IP forwarding function is employed to connect networks together, such as a LAN to a WAN, in order to access the Internet or other networks. Devices in communication with the router via a LAN utilize some portion of the "bandwidth" available to that router. The amount of bandwidth utilized depends on a variety of factors, such as the size of data packets being forwarded by the router to any particular connected or distant device. Certain types of applications require significantly more bandwidth than others; e.g., streaming video or multimedia applications (e.g., watching a YouTube video) will typically consume much more bandwidth than e-mail, Internet browsing, short message or text applications.

Conventional data networks typically provide what is known as "best efforts" service to all network traffic. For example, in a TCP/IP network, "best efforts" service is the default behavior, in which network nodes drop packets indiscriminately when faced with excessive network congestion. With "best efforts" service, there is no mechanism for ensuring reliable delivery of data (i.e., no quality-of-service, or QoS).

In certain situations, such as when a device requests streaming or continuous media applications (e.g., the aforementioned YouTube video clip, or video conferencing), a fairly constant and relatively high amount of the router's bandwidth is demanded to send and/or receive the information packet stream. Some of these data also have a very high sensitivity to jitter (variability in delivery time due to, e.g., network congestion), loss and delay, and are not able to tolerate significant lapses in network performance.

It follows as well that, as the number of LAN devices increases, the demand on the available bandwidth increases. Likewise, as new applications for use in distributed networking environments are developed, the problems associated with managing network resources are intensified. For example, a network may experience unsatisfactory performance as a result of users placing too high of a load on the network, and such demands may be from uses that are inconsistent with network operator business or other objectives. Thus, solutions for managing data networks using packetized protocols such as TCP/IP become necessary to cope with the increased demands; otherwise, congestion, application unpredictability, user frustration and loss of productivity can occur.

To address these network management issues, various solutions have been employed. For example, network managers often selectively add or re-allocate bandwidth to alleviate congestion. Network operators may also employ quality of service ("QoS") and policy-based management techniques.

As previously referenced, quality-of-service (QoS) refers generally to resource reservation and control mechanisms which guarantee a certain level of performance to a data flow in accordance with requests from the application program or Internet service provider policy. QoS can be used for example to disallow certain types of packets, to slow transmission rates, to establish distinct classes of services for certain types of packets and/or users, to mark packets with a priority value, and/or to establish a queuing system. By one or a combination of these methods, QoS systems are able to give preferential treatment to certain network traffic. See, for example, U.S. Pat. No. 7,274,700 to Jin, et al. issued Sep. 25, 2007 and entitled "Router providing differentiated quality of service (QoS) and fast internet protocol packet classifying method for the router" which discloses a router for supporting differentiated QoS, and a fast Internet protocol (IP) packet classification method performed in the router. The router hierarchically divides a memory having flow tables into a fast internal cache memory and an external typical memory. The internal cache memory stores recently searched table entries. The router preferentially searches the flow tables of the internal cache memory. Only when the internal cache memory searching fails, the flow tables of the external memory are searched. Consequently, the frequency of interactions between a packet classifier and the external memory decreases to improve the speed of packet classification. The foregoing patent is merely illustrative of a broader class of prior art dealing with mechanisms for providing or enforcing QoS policy.

As the name implies, so-called policy-based network management uses policies, or rules, to define how network resources are to be allocated. An example of a policy could be to block access or disallow packets if the IP source address of the data is included on a list of disallowed addresses. A policy-based network management resource may also be utilized in conjunction with the aforementioned QoS methods, wherein the policy-based network determines when and how the QoS techniques should be applied. See, for example, U.S. Pat. No. 7,254,628 to Koops, et al. issued Aug. 7, 2007 and entitled "Network management system with validation of policies" which discloses a network management system (NMS) including a policy manager (PM) associated with a set of policies and including distribution means for sending said policies to policy enforcement points in accordance with distribution instructions via policy decision points, characterized in that said policy manager further includes validation means for validating if said policy enforcement points can enforce said policies and correcting said distribution instructions as a function of said validation.

Further, as noted above, bandwidth allocation has to some extent been employed to address the aforementioned network management issues. For example U.S. Pat. No. 7,002,971 to Enns, et al. issued Feb. 21, 2006 and entitled "High-speed internet access system" discloses an asymmetric network system which manages bandwidth allocation and configuration of remote devices in a broadband network. A modular architecture of the system permits independent scalability of upstream and downstream capacity separately for each of the upstream and downstream physical paths. Allocation of downstream bandwidth to requesting devices is made according to bandwidth utilization by other devices, bandwidth demand by the requesting remote device, class or grade of service by the requesting remote device or bandwidth guaranteed to other remote devices. Configuration parameters remotely managed by the network include device addresses (global and local), transmission credit values, upstream channel assignment and upstream transmit power level. Further, management of device configuration profiles and bandwidth allocation occurs through control and response packets respectively generated by the network and the remote devices according to network operating software located at both ends. Control packets include poll packets that request, among other things, demand for an upstream transmission. Configuration packets instruct remote devices to assume an operational state or return status or statistical data. Response packets transmitted by the remote devices provide information to the network operations center for control purposes or to confirm the state of operation of remote devices, including channel operating statistics, errors, noise, etc. in order to remove or reallocate assigned upstream channels. Downloadable network operating software enables the network operator to upgrade remote operating software or to reconfigure the response profile of the remote devices. Account administration and usage reports are also generated. IP or ATM encapsulation, as well as forward error correction and encryption, are employed in the network.

U.S. Pat. No. 7,260,635 to Pandya, et al., issued Aug. 21, 2007 and entitled "Software, systems and methods for managing a distributed network" discloses a system and method for managing network bandwidth consumption. The system may include an agent module loadable on a networked computer and configured to aid in managing bandwidth consumption within a network. The agent module is configured to obtain an allocation of network bandwidth usable by the networked computer, and is further configured to sub-allocate such allocation among multiple bandwidth-consuming components associated with the networked computer. The system may further include multiple such agent modules loadable on plural networked computers, and a control module configured to interact with each of the agent modules to dynamically manage bandwidth usage by the networked computers.

U.S. Pat. No. 7,054,327 to Hagirahim, et al., issued May 30, 2006 and entitled "Method of providing quality of service (QOS) to voice applications in routed IP networks" discloses a simplified methodology for accomplishing traffic management in a packet based network which is achieved by allowing allocation of bandwidth based on a count of the number of endpoint connections associated with a specific service for a corresponding network device. A network device (e.g., IP router) can be configured to count the number of TCP/IP and UDP/IP connections and bandwidth usage per interface. The counting can be done by identifying the IP Addresses, Type of Service (TOS), and TCP/UDP and/or UDP/IP socket number range in the IP Header of a packet and then querying a specific communication type. When reaching the maximum allowed connections or bandwidth for a specific service, the network device (e.g., IP router) stops forwarding any new calls by means of dropping packets of new calls and informing the given endpoints to disconnect the new calls. In one exemplary embodiment of the invention, a procedure for managing traffic flowing through individual routers of a packet network includes the steps of reserving a given amount of bandwidth on interfaces of the individual routers for specific types of communications traffic, periodically querying endpoint connections based on data from a corresponding router connection table, receiving responses from the periodic querying to determine a current connection status and bandwidth allocation of said endpoints and calculating current bandwidth allocation for a specific type communications service on an interface handled by the router. The router admits additional communications traffic for a specific type of communications service if bandwidth is available.

U.S. Pat. No. 6,771,661 to Chawla, et al., issued Aug. 3, 2004 and entitled "Apparatus and methods for providing event-based data communications device configuration" discloses a system and method which enable a data communications device to be programmed to automatically and dynamically modify allocation of resources upon the occurrence of specific events or times without having to break active sessions of data communications. Resource allocations can be made by bandwidth reservations provided to a data communications device via a network policy or via individual bandwidth reservation messages. The bandwidth allocation information can specify a session of data communication and future bandwidth modification information, such as a time or event, which will cause the data communications device to modify an amount of bandwidth reserved for the specified session of data communications. In operation, a data communications device receives bandwidth allocation information indicating future bandwidth allocation modification information associated with a session of data communication. The data communications device then can determine a future event upon the occurrence of which the data communications device will modify an amount of bandwidth allocated to the session of data communication. The future event can be determined based upon the future bandwidth allocation modification information and event information such as a time signal from a clock or another event signal. The data communications device can detect the occurrence of the future event in the data communications device and in response to detecting its occurrence, can modify the amount of bandwidth allocated to the session of data communications in the data communications device. Extensions to a bandwidth reservation protocol such as the RSVP protocol are defined which allow RSVP bandwidth reservation messages to specify the future bandwidth modification information.

Example—WiFi Hotspots

In the context of now ubiquitous wireless access points (e.g., WiFi "hotspots" or "APs"), little in the way of user-based configuration control of these access points or gateways is evident in the prior art. Typically, such access points will negotiate with any entity providing the proper protocol and credentials (e.g., any WiFi station or "STA" that wishes to join an AP), and the data/communications bandwidth available to the AP (such as via a wired Ethernet or similar connection to an Internet service provider) allocated on an as-available or first-come-first served basis. Via intrinsic security mechanisms, AP administrators can lock out certain users who e.g., do not authenticate properly or provide proper credentials; however, this is generally an all-or-nothing proposition, and different types of service levels cannot be selectively provided (and dynamically altered). For example, an 802.11 AP located in a common residential or enterprise setting such as an apartment building or office may be within wireless range of a number of different STAs; it may not be desired to let all of these STAs communicate with the AP, or at least have unrestricted access or equal "stature" to one or more priority users (e.g., the owner of the AP).

Moreover, the connections or associations between the AP and one or more of the STAs may be highly transitory in nature, and therefore also highly variant from a resource allocation perspective. Significant fluctuations in the number of users and associated bandwidth requirements may occur, thereby significantly impacting non- or less-transient users, including e.g., the aforementioned "priority" users. Stated simply, there is a need for an AP owner/administrator to control the use of his or her own AP, and assure that adequate resources are available when they are needed. This need has heretofore been in effect mutually exclusive with providing access and use of the same AP by other non-priority (e.g., public) users.

A variety of different approaches to providing WiFi hotspot service are known in the prior art. For example, the "FON" Wireless Ltd. system of shared wireless networks is based on FON members ("Foneros") who agree to share their WiFi access in return for free access to all other WiFi access points within the community. FON also sells low-cost access to non-community members. FON's La Fonera routers enable Foneros to share their home WiFi access. La Fonera routers split the WiFi signal, creating a secure private channel (i.e., for broadband Internet) and a separate channel to share with other Foneros.

Foneros comprise generally two varieties: "Linuses" and "Bills". Linuses and Bills are registered FON users who share bandwidth with other Foneros. Alternatively, so-called "Aliens" are registered FON users who do not share their bandwidth, but who may access the FON Community such as by purchasing access passes (FON Passes). By utilizing the La Fonera WiFi Router, both Linuses and Bills can share their WiFi in exchange home and roaming WiFi privileges.

Similarly, the Netgear HSIAB-001 "Hotspot in a Box" is a system aimed at small businesses to enable them to host their own public access WiFi (Wireless) Hotspot. The system comprises a dual band wireless VPN firewall router (FWAG114) and a managed WiFi Hotspot service (i.e., "The Cloud"). Hotspot-in-a-box enables a business owner to offer wireless broadband Internet connectivity to its customers without the requirements of managing a WiFi network.

WiFi users can obtain online access with their service provider via the Cloud's WiFi network (for example BT Openzone), or alternatively use a pay-as-you-go solution to buy access time while they are at the business location. The business owner providing the hotspot earns money for the time that someone is connected (managed by The Cloud and paid directly to the business owner).

Despite the foregoing approaches, there is a salient need for a mechanism to effectively manage and control the operation of a network (including for example WiFi "hotspots" within a wireless LAN) by inter alia allocating the available resources, such as bandwidth, according to user-determined specifications or input.

Such methods and apparatus ideally should provide the network administrator with readily accessible and flexible control over their network for a variety of different operational circumstances, and according to a number of different network parameters such as type of application, geographic proximity or location (e.g., range), type of wireless air interface, etc., and should not significantly impede router or gateway performance due to e.g., latencies associated with administrative processing.

The ability to reserve resources for certain classes of users would also be highly desirable.

SUMMARY OF THE INVENTION

The present invention satisfies the foregoing needs by providing, inter alia, methods and apparatus for the allocation of bandwidth in a data network such as for example a routed wireless IP network.

In a first aspect of the invention, a method for allocating network bandwidth between two or more substantially heterogeneous uses is disclosed. In one embodiment, the method comprises: providing available bandwidth; allocating a first portion of the available bandwidth to the first use; and allocating a second portion of the available bandwidth to the second use. At least one of the acts of allocating may be performed dynamically during operation of the network.

In one variant, the network comprises a wireless network, and the act of providing available bandwidth comprises providing at least a portion of available forward link or reverse link bandwidth associated with an air interface. The first and second substantially heterogeneous uses may comprise (i) a public use, and (ii) a private or user-specific use, and The available bandwidth is associated with a wireless gateway or router device within the network, and the dynamic allocation comprises dynamically allocating using an allocation algorithm running on the device. The wireless network comprises for example an IEEE-Std. 802.11 compliant wireless network, and the available forward link or reverse link bandwidth is associated with a gateway or router device.

In another variant, the first and second substantially heterogeneous uses are associated with different wireless air interfaces, such as e.g., a WiFi interface and a WiMAX interface. Alternatively, the air interfaces may comprise a direct sequence spread spectrum (DSSS) interface and an orthogonal frequency division multiplexing (OFDM) interface.

In yet another variant, the first and second substantially heterogeneous uses are associated with different ranges from a wireless gateway or router device that is part of the network. For example, the first and second substantially heterogeneous uses may be further associated with different wireless air interfaces, e.g., a WiFi interface that is used for a shorter one of the ranges, and a WiMAX interface that is used for a longer one of the ranges.

In a further variant, the ranges are different across the different uses; e.g., a "public" range is different than the user-specific or private range.

In a further variant, the first and second substantially heterogeneous uses are associated with different frequency bands; e.g., a first band with a center frequency below 2 GHz, and a second band with a center frequency above 2 GHz.

In still another variant, the first and second substantially heterogeneous uses are associated with different quality of service (QoS) requirements for data carried over the first and second portions of the available bandwidth.

In yet another variant, the first and second substantially heterogeneous uses are associated with different channel coding schemes for data carried over the first and second portions of available bandwidth; e.g., turbo coding and Viterbi coding.

In still a further variant, the method further comprises using a plurality of network devices to provide the available bandwidth. For example, two or more WiFi access points (APs) may be used to supply the available bandwidth.

In another variant, the first and second substantially heterogeneous uses are associated with different levels of network security. For example, the different levels of network security may comprise (i) symmetric key encryption, and (ii) asymmetric key encryption. As another option, at least one of the different levels of network security comprises authentication, encryption, and data integrity protection, such as under an 802.1x or similar scheme.

In a second aspect of the invention, apparatus for the allocation of network bandwidth is disclosed. In one embodiment, the apparatus comprises: first apparatus adapted to provide network bandwidth; and second apparatus in data communication with the first apparatus and adapted to run a computer program, the computer program adapted to: (i) generate a user interface to enable a user to view bandwidth allocation of the first apparatus; and (ii) specify a desired bandwidth allocation scheme for the apparatus.

In one variant, the first apparatus comprises a network access point or gateway; including e.g., a wireless air interface compliant with IEEE Std. 802.11.

In another variant, the specification of a desired bandwidth allocation scheme comprises an allocation scheme that allocates at least portions of the network bandwidth between at least (i) a public use, and (ii) a private or user-specific use.

The network bandwidth may also vary as a function of time, and the scheme is further adapted to dynamically vary the allocation of the bandwidth between the public use and the private or user-specific use so as to maintain the bandwidth available to at least one of the uses substantially constant. Alternatively, the scheme is adapted to dynamically vary the allocation of the bandwidth between the public use and the private or user-specific use so as to enforce at least one quality-of-service (QoS) policy for at least one of the uses.

In another embodiment, the apparatus is adapted to allocate network bandwidth between first and second uses, the first and second uses being substantially heterogeneous, and the apparatus comprises: a network interface configured to provide access to an external network, the interface having available bandwidth associated therewith; at least one wireless interface adapted to communicate data with one or more mobile devices; and computer program apparatus adapted to allocate a first portion of the available bandwidth to the first use, and a second portion of the available bandwidth to the second use, based at least in part on user input.

In a third aspect of the invention, a computer readable storage apparatus is disclosed. In one embodiment, the storage apparatus comprises a program memory that stores a computer program having a plurality of instructions associated therewith. When executed, the program enables the manual or automatic allocation of resources (e.g., bandwidth associated with a wireless network) between two or more classes of use. In one variant, the program further allows for the application of multiple operational "rules" that allocate resources to a plurality of users associated with a wireless gateway or router.

In a fourth aspect of the invention, a method of arbitrating between various uses within a multi-user network is disclosed. In one embodiment, the network comprises a wireless network such as one compliant with IEEE Std. 802.11, and the method comprises: designating at least first and second uses of said network; determining resource requirements associated with each of said first and second uses; and dynamically allocating available resources based at least on said requirements. In one variant, the available resources are constrained, the resource requirements exceed the available resources, and the dynamic allocation comprises arbitrating between uses based on one or more arbitration parameters.

In a fifth aspect of the invention, a computerized device adapted to selectively configure a network node for resource allocation is disclosed. In one embodiment, the computerized device comprises a personal computer that is placed in wired or wireless data communication with the node, and the node comprises a WiFi-enabled access point (AP). The personal computer comprises a first portion or module of a distributed administrator computer program, the first portion communicating with a second portion or module operative to run on the AP, the first portion enabling a network administrator or user to selectively configure and control the operation of the AP.

In another embodiment, the computerized device comprises a portable or mobile communications device such as a smartphone, which comprises a client portion of the administrator program which can communicate (via an interposed wired or wireless PHY) with another portion running on the AP.

In a sixth aspect of the invention, a method of doing business is disclosed. In one embodiment, the method comprises providing certain ones of a plurality of users of a wireless network with access privileges to assure available bandwidth for these users. In one variant, the access privileges are provided at least sometimes within a resource-constrained environment, and in exchange for consideration from the user(s) such as a monthly or annual fee.

In a seventh aspect of the invention, a computer-readable apparatus comprising a storage medium adapted to store a computer program thereon is disclosed. In one embodiment, the computer program is adapted to: communicate with the at least one apparatus adapted to provide available bandwidth; enable a user to view bandwidth allocation of the at least one apparatus adapted to provide available bandwidth; and enable a user to set a desired bandwidth allocation arrangement of the at least one apparatus adapted to provide available bandwidth.

In an eighth aspect of the invention, a method of allocating network resources between at least first and second uses, the first and second uses being substantially different, the method comprising: providing available resources; allocating a first portion of the available resources to the first use; and allocating a second portion of the available resources to the second use; wherein at least one of the acts of allocating is performed dynamically during operation of the network based at least in part on the demand for the first use and the second use.

In a ninth aspect of the invention, mobile apparatus for administering a wireless network is disclosed. In one embodiment, the apparatus comprises: a digital processor; a storage device in data communication with the processor; a first wireless interface adapted for communicating with a network access device; and a computer program stored at least partly within the storage device. The computer program comprises a plurality of instructions which, when executed on the processor: generate a user interface; receive inputs regarding administering the network access device from a user via the user interface; and transmit data relating at least in part to the inputs to the access device via the interface.

In one variant, the apparatus further comprises a second wireless interface, the second interface comprising a cellular air interface, and the first wireless interface comprises a wireless LAN interface. For example, the cellular air interface may comprise a 3G air interface, and the first wireless interface a WiFi interface.

In another variant, the administering the network access device comprises implementing one or more policies for allocating at least one resource of the access device.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 3b is a block diagram illustrating a third embodiment of a network architecture employing resource allocation according to the present invention, wherein administration delegation is utilized.

DETAILED DESCRIPTION OF THE INVENTION

Figure 1:
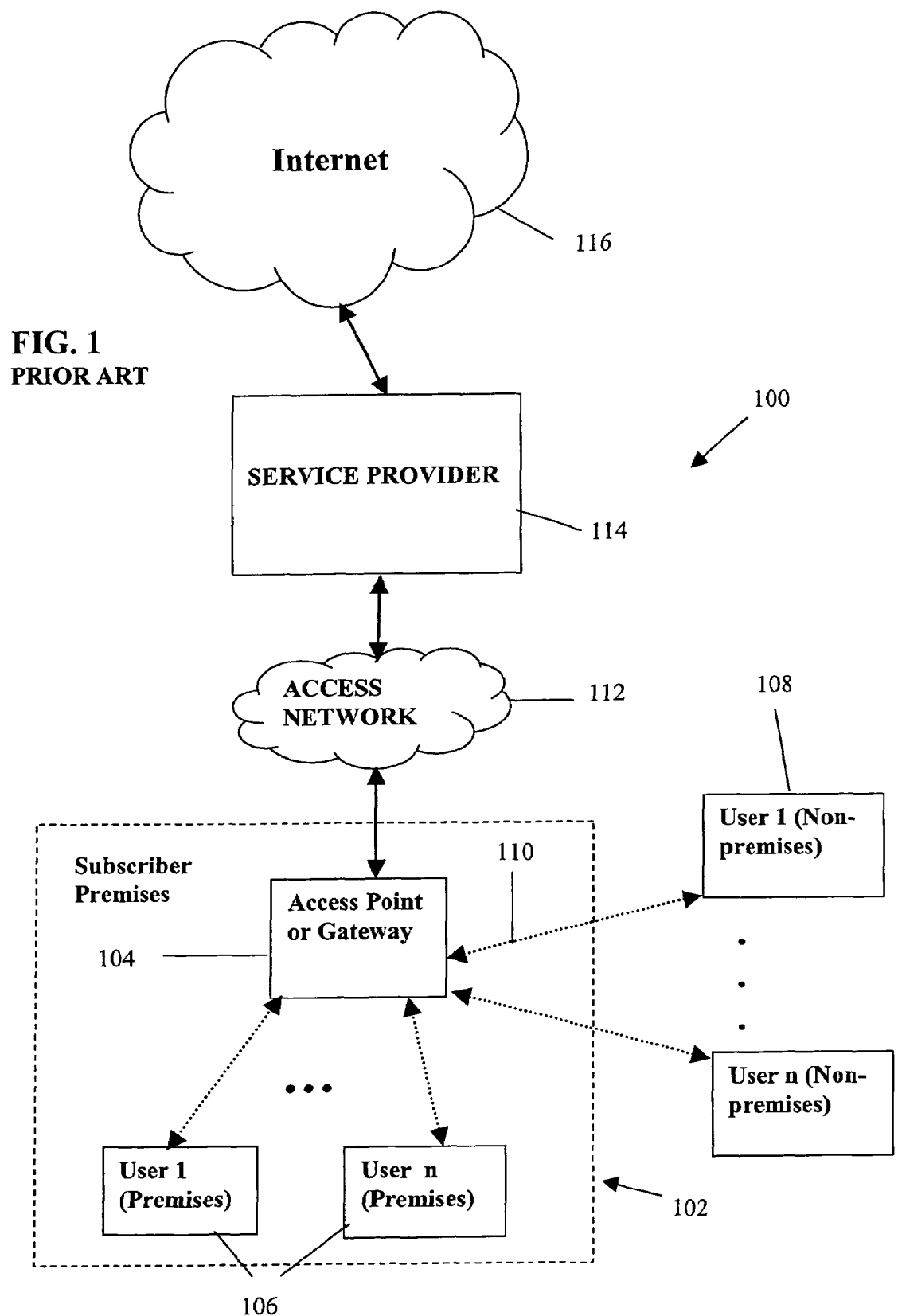
FIG. 1 is a block diagram illustrating a typical prior art wireless network.

As used herein, the term "access point" or "AP" refers generally and without limitation to a network access point (e.g., such as a gateway or router). For example, one type of access point might comprise an Ethernet router. Another type of access point might comprise an IEEE Std. 802.11 WiFi AP. These terms should in no way be construed as to be limiting to a particular network standard, protocol, or topology.

As used herein, the terms "client device" and "end user device" include, but are not limited to, personal computers (PCs), and minicomputers, whether desktop, laptop, or otherwise, and mobile devices such as handheld computers, PDAs, video cameras, personal media devices (PMDs), such as for example the Apple Inc. iPod™, smartphones such as the Apple Inc. iPhone™, or any combinations of the foregoing.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols and standards (e.g., SONET, DOCSIS, IEEE Std. 802.3, 802.11, 802.15, 802.16, 802.20, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a, b, g, n, etc.), WiMAX (802.16), PAN (802.15), or IrDA families.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, CDMA2000, etc.), FHSS, DSSS, GSM, PAN/802.15, WiMAX (802.16), Mobile Broadband Wireless Access or MWBA (802.20), narrowband/FDMA, OFDM, PCS/DCS, analog cellular, CDPD, satellite systems, millimeter wave or microwave systems, acoustic, and infrared (i.e., IRDA).

Overview

In one salient aspect, the present invention provides methods and apparatus for allocating available bandwidth in a data network (e.g., a routed IP network such as a wireless LAN or WAN) according to user specifications or preferences. As previously described, prior art approaches to providing shared wireless (or wireline) access to finite resources such as bandwidth have been largely uncontrollable by the user, or where controllable, more of an "all or nothing" nature. In contrast, the present invention seeks to provide a network administrator with enhanced flexibility and options in terms of managing resource allocation within their network.

In one exemplary embodiment, the network comprises a wireless (e.g., WiFi) network, and the access device comprises a wireless router or gateway in communication with a plurality of wireless users. The access device comprises an administrator function which allows the network administrator to implement one or more resource allocation policies or rules. Using this approach, resources such as bandwidth can be allocated based on any number of different parameters or use classifications, including for example: (i) public versus private use; (ii) security level (including differentiation based on security requirements for different types of traffic); (iii) user range from the access device; (iv) type of PHY or air interface; (v) type of channel coding; (vi) air interface mode or application (e.g., data versus voice).

In one variant, the allocation policies are manually controlled by the administrator, such as by changing settings on a GUI accessible by the administrator.

In another variant, substantially automatic resource allocation is performed by the administrator program based on one or more parameters (including policy or rule inputs from the administrator) such as time of day/date, types of requests for resources pending, historical or predictive data, instantaneous bandwidth consumption, and the like.

Detailed Description of Exemplary Embodiments

Exemplary embodiments of the present invention are now described in detail. It will be appreciated that while the exemplary embodiments are described primarily in the context of a WiFi (i.e., IEEE Std. 802.11) air interface and protocol, this context is merely illustrative, and the invention is in no way so limited to WiFi applications (or any other air interface or specification).

Methods—

FIG. 1 illustrates a typical prior art wireless (e.g., WiFi) network configuration. As shown in FIG. 1, the network 100 comprises a premises (such as a residence or enterprise) 102 having an access point (AP) 104 and a plurality of devices (STAs) 106 in wireless communication therewith. The AP 104 acts as a wireless/wired (e.g., 802.11/Ethernet) or wireless/wireless (e.g., 802.11/3G cellular) gateway and router for the premises network, and provides access to external networks such as the Internet 116 via a service provider 114 such as an ISP or cellular service provider (CSP).

As previously described, other users 108 not specifically within the premises 102 may also be in wireless communication with the AP 104, such as where the AP 104 is located nearby and within range of the wireless link of the other users (and vice versa). For example, a user's premises 102 might comprise an apartment in an apartment building, and the other user 108 a neighbor in another apartment in the same building. It will be appreciated that the number of premises users 104 and non-premises or other users 108 may vary as well.

As previously noted, one salient deficiency with prior art approaches such as that of FIG. 1 relates to the inability of the owner or administrator of the AP 104 to control the allocation of communications bandwidth or other resources available to the AP. For example, in the case of an WiFi/Ethernet gateway, the Ethernet connection might provide peak bandwidth of 100 Mbps, or 1000 Mbps (GBE), and the WiFi link say 54 Mbps. Hence, as multiple users access the AP 104, the Ethernet connection bandwidth will become the limiting factor; i.e., the 100 or 1000 Mbps will be divided among the multiple users (assuming one connection/IP address). Moreover, there are practical limitations on the number of STAs that can associate with an AP 104. Hence, depending on the number of associations formed and their individual bandwidth requirements, resource (bandwidth) contention may occur.

Such contention can also have implications for QoS for one or more of the associated users. For example, if a particular user is streaming multimedia (e.g., a video via RTP/RTCP delivery protocol), and contention occurs, the contention may cause packet delay outside the parameters of the associated jitter buffer (if used), and significant packet loss, thereby causing the user's experience to be degraded. Similarly, in the VoIP context, call packet jitter may be significant, thereby causing packet loss and hence "choppy" audio signal quality. The affected prior art user has no real way of both sharing their available router/gateway connection bandwidth and controlling it so that certain desired conditions (e.g., QoS) are maintained.

Accordingly, the methods of the present invention seek to address these disabilities by providing a mechanism by which different classes (and subclasses) of users can be allocated resources in a controlled and selective manner so as to, e.g., maintain one or more desired network conditions. For example, in a first embodiment of the invention, the allocated resource comprises network bandwidth, and the allocation is performed between one or more "private" users and one or more "public" users so as to maintain a prescribed minimum available bandwidth for the private users at all times. As discussed subsequently herein in greater detail, other "resources" may also be controlled and allocated according to user/administrator preferences using the present invention as well.

For the purposes of the present discussion, the in-premises users 104 shown in FIG. 1 will be considered priority or "private" users, and the non-premises users 108 will be considered non-priority or "public" users. These classifications are completely arbitrary, yet provide a convenient vehicle for illustrating the various features of the present invention. Accordingly, and as described in greater detail below, different classifications can be assigned to, and used as a basis for differentiating, different users.

Moreover, one or more hierarchies may exist within the aforementioned classes, such that "tiered" service may be provided within a class. For instance, within the class of priority users, certain users may be given higher priority for certain resources or services than other users, the other users in that class still having higher priority than users not in the class.

Service classes and/or hierarchies can also be administered on a per-service (and per-user) basis, such as where a first user in a given class is given higher priority for services A and B than other users in the same class (and those in one or more other classes), but lower priority for service C than the other users in that class. Alternatively, the priority may jump the class boundary; e.g., in the aforementioned example, the first user may be given higher priority for services A and B than others in the same class and one or more other classes, but lower priority than others in the same class and the one or more other classes for service C. Myriad other variations and permutations of service priority classification and hierarchy will be appreciated by those of ordinary skill given the present disclosure, and accordingly are not described further herein.

Figure 2:
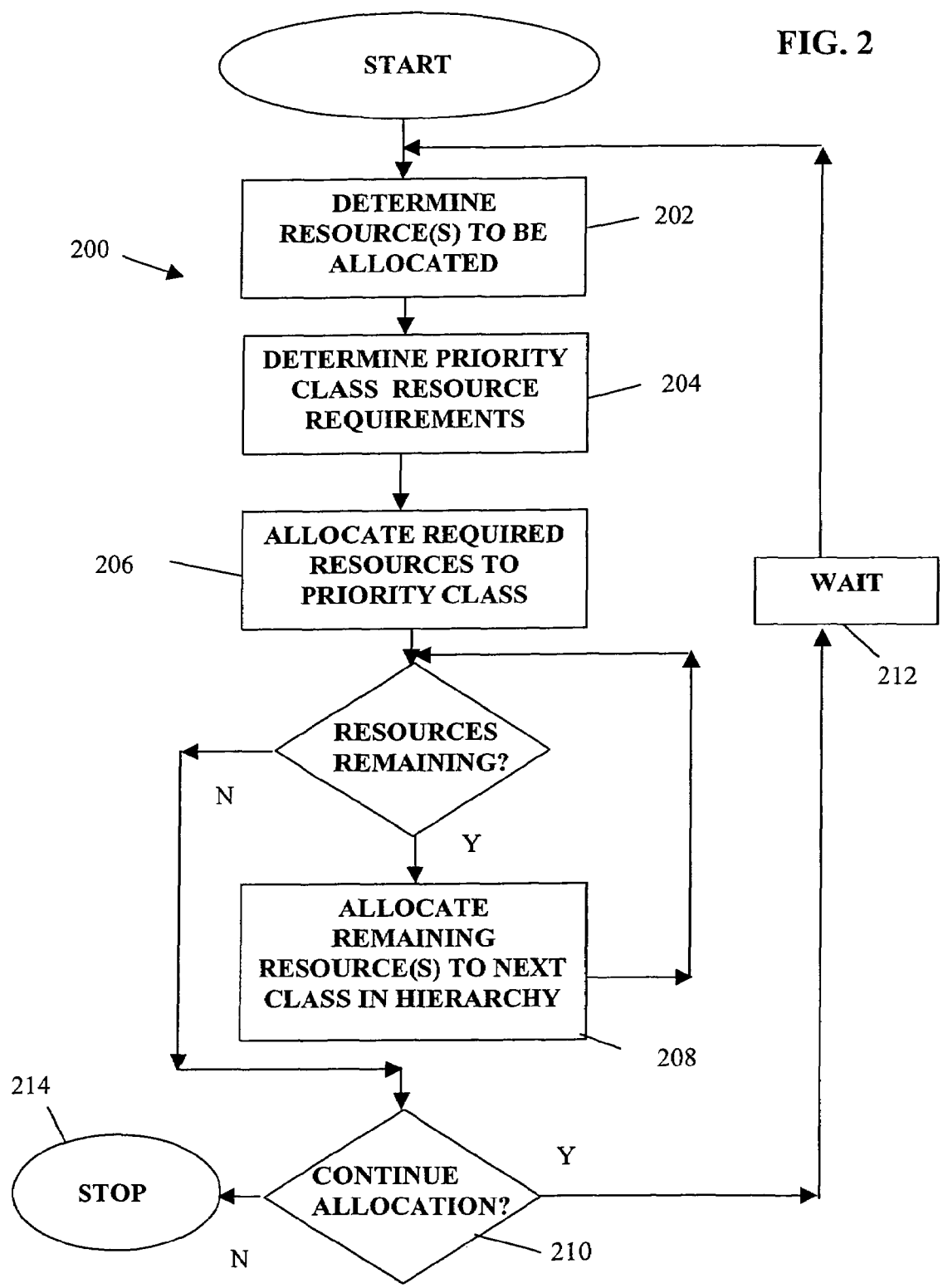
FIG. 2 is a logical flow diagram illustrating a first exemplary embodiment of the method of resource allocation according to the invention.

FIG. 2 graphically illustrates one embodiment of the foregoing methodology according to the invention.

As shown in FIG. 2, the exemplary method 200 comprises first providing a resource, e.g., bandwidth, to be allocated (step 202).

Next, in step 204, the resource requirements for the priority (e.g., private) class are determined. For instance, the private users may desire to maintain sufficient bandwidth at all times to support one or more QoS requirements. Note that this determination of step 204 may be made once in a static fashion (such as by a user specifying that they wish to maintain at least X Mbps or Y percent of total bandwidth), or alternatively may be made dynamically and even recursively (e.g., periodically sampled by an algorithm running on the router/gateway or an associated control device, and the minimum threshold dynamically reset or adjusted).

As another alternative, the user may specify (via a client program and associated user interface operative on the router/gateway or control device, discussed in greater detail below) or select one or more predetermined use profiles, from which the requirements are determined. For example, in one variant, the device may be configured with three (3) different use profiles corresponding to three different resource use characterizations, including e.g., (i) high-bandwidth multimedia, (ii) low-bandwidth multimedia, and (iii) very low bandwidth (other). These three profiles might correspond to a range of: (i) maximum to X bandwidth (Mbps), (ii) X Mbps to Y Mbps (X>Y); and (iii) Y Mbps to zero Mbps, respectively. If the user knows that they will only be performing low bandwidth operations or requests for a period of time, they might select the third option (very low) for use with the "private" portion, thereby freeing the maximum for public or other desired uses. Any number of other different schemes and profiles will be recognized by those of ordinary skill given the present disclosure. For example, so as to make the user experience even more desirable or intuitive, fuzzy logic or Bayesian variables, or use applications, can be specified by the user; i.e., "high", "medium", or "low" bandwidth (without specific hard variable ranges selected by the user per se), or alternatively "multimedia", "applications", "download", etc.

In yet another embodiment, highly directional systems can be segmented or partitioned based on geometry; e.g., certain sectors allocated to one use, and other sectors to other uses.

As discussed in greater detail subsequently herein, any number of different user interfaces can be used to implement the foregoing functionality, including for example GUIs (e.g., pulldown menus, toolbar icons, pop-up windows, and so forth), soft function keys (SFKs) or fixed function keys (FFKs), front-panel LEDs and buttons, touch screen interfaces, audible or voice controlled interfaces (e.g., CELP-based speech recognition), and so forth, consistent with the aim of providing a user with at least some degree of control over resource allocation. These interfaces can be integrated into the router/gateway device itself, or implemented on a local control device such as a PC, handheld computer, smartphone, remote unit, etc. that is in communication with the router/gateway.

In another variant, the router/gateway (or associated device) can include a computer program (e.g., resource management client application) that automatically detects the type of activity by the user, and adjusts the allocation of resources by the router/gateway dynamically as a function of varying use. For instance, in one example, the user might invoke a VoIP client application on their WiFi enabled PC, and also simultaneously begin streaming a video over the Internet. The aforementioned computer program determines that these applications are running (such as via a software registry, inter-process communication/messaging, or any number of other well known mechanisms) and active, and based on classification information relating to each application, automatically select a resource allocation scheme for use by the router/gateway. The aforementioned VoIP application might be classified by the resource management client program as "low bandwidth", and the streaming video application (e.g., Windows Media, Real Player, etc.), as "high bandwidth", thereby in combination making the client's resource requirements "high bandwidth" for purposes of allocation. This classification can be predetermined (e.g., multimedia clients are by definition high bandwidth, etc.) or dynamically determined by the resource manager itself during use (e.g., through detection of actual bandwidth usage over a prescribed period of time, variations or peaks in instantaneous bandwidth usage, and so forth).

Referring again to FIG. 2, the method 200 next comprises allocating the required resources as determined in step 204 to the priority or private class (step 206). Any remaining resources are then allocated to the public class (or next class in the hierarchy) per step 208. This allocation may be done recursively as well; e.g., allocate certain resources down through the class hierarchy, and then other resources, and so forth.

If additional evaluation is required (step 210), the method returns to step 202 via e.g., a wait state 212, or alternatively terminates per step 214.

Figure 2A:
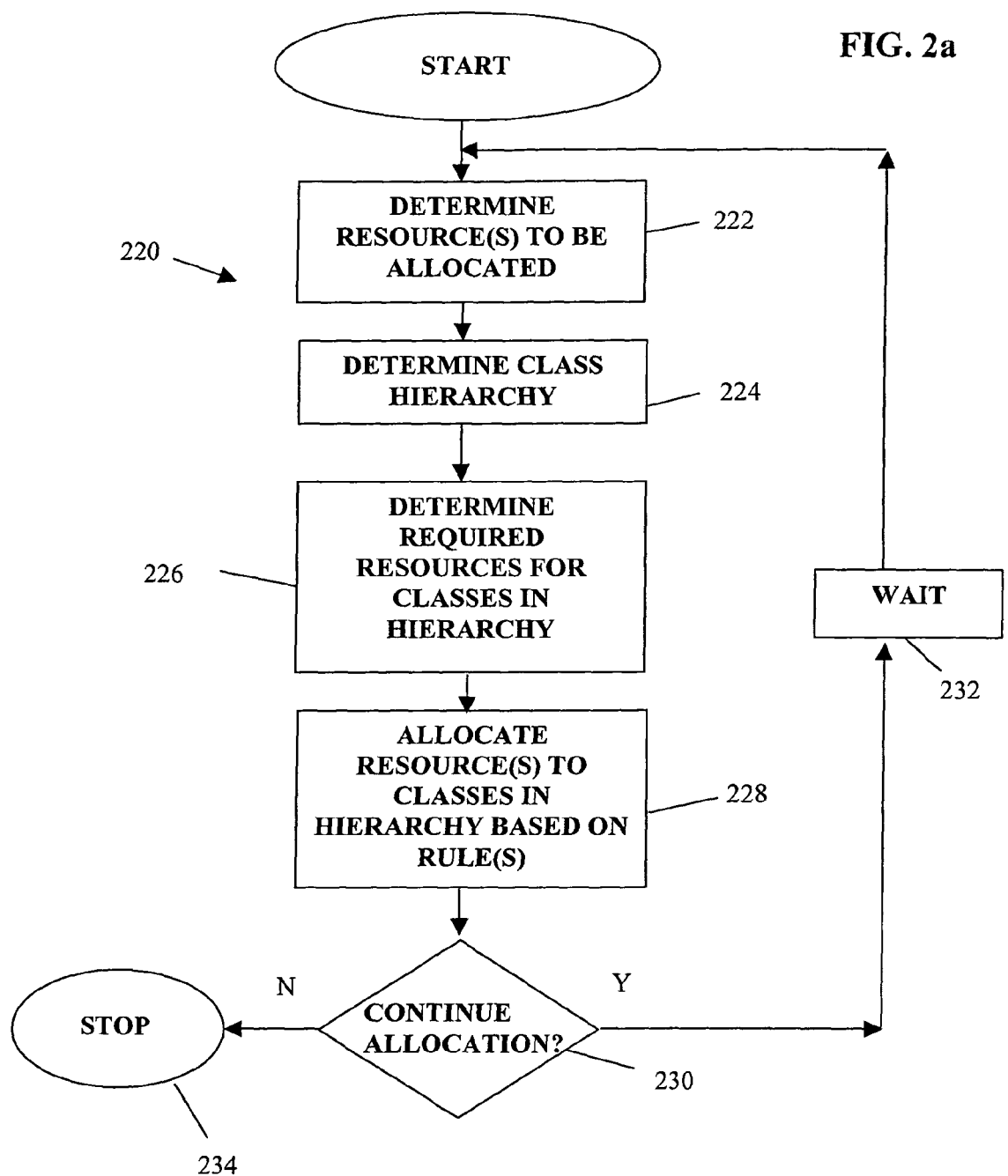
FIG. 2a is a logical flow diagram illustrating a second exemplary embodiment of the method of resource allocation according to the invention.

FIG. 2a illustrates an alternate embodiment of the allocation methodology according to the present invention. As shown in FIG. 2a, the method 220 comprises first determining the available resources to be allocated (step 222). Next, the classes within the hierarchy are determined per step 224. The resource requirements of the classes identified in step 224 are then determined per step 226. The resources are allocated across each of the classes according to one or more resource allocation rules (e.g., those based on user or administrator input or initial configuration) per step 228. If more evaluation or allocation is to occur (step 230), the process continues by way of a wait state (step 232), or alternatively the process terminates at step 234.

It will be appreciated that in the embodiment of FIG. 2a, the class hierarchy and resource allocations are applied according to a rule after considering the class structure and available resources. This is in contrast to the exemplary method of FIG. 2, wherein the priority class is evaluated and serviced first, irrespective of other classes and requirements. Other allocation schemes may be used as well, including without limitation hybrids or combinations of the methods of FIGS. 2 and 2a.

Figure 2B:
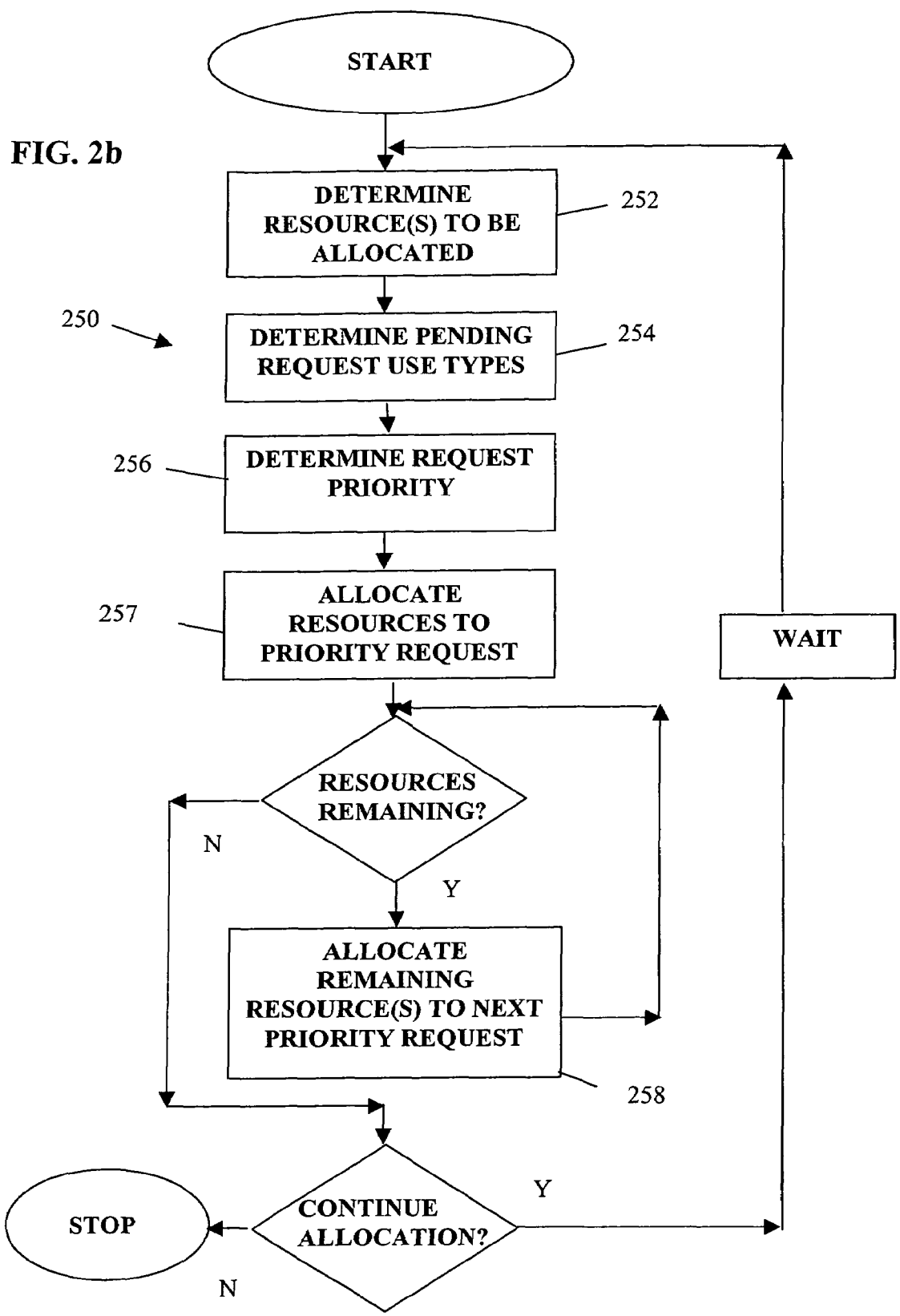
FIG. 2b is a logical flow diagram illustrating a third exemplary embodiment of the method of resource allocation according to the invention.

Referring now to FIG. 2b, yet another embodiment of the allocation methodology according to the invention. As shown in FIG. 2b, the method 250 comprises first determining the resources to be allocated (e.g., bandwidth available) per step 252.

Next, per step 254, the use types (e.g., applications) of the pending requests for services by the AP are identified.

Based on use type, the pending requests are then prioritized per step 256. Once at least the first priority request is identified, resources are allocated to that request per step 257. This allocation may be conducted in a "rolling" fashion; e.g., wherein once the first priority request is identified, all requisite resources are allocated irrespective of other uses/requests, or alternatively based on evaluation of all requests and their relative priority (from which the first priority request might not be allocated all requisite resources, but rather on a "best efforts" or other such basis).

Per step 258, if remaining resources are available, they are allocated to the next priority request (e.g., next in the priority queue) until either all resources are exhausted, or all pending requests serviced.

It will also be appreciated that while the foregoing embodiments are described primarily in terms of an AP administrator or owner being provided control over the AP and related functions, the administrator or owner can also delegate this control to others, to include even the other users. For example, one such paradigm comprises the aforementioned administrator program allowing the administrator or owner to delegate a portion of the available bandwidth to a "secondary" administrator or group of users, while retaining control over the remaining portion. For instance, the administrator might reserve 40% of available at all times to his/her control (which may include therein public/private allocations, allocation by range, allocation according to security level, etc., as previously described herein), with the remaining 60% being "uncontrolled" and/or allocable to any number of different users or uses. It should be noted that this is not the same as the private/public allocation previously described; rather, under the current example, all uses may be private or public, secure or non-secure, etc. if desired, with the ability to allocate being allocated (as opposed to the resource itself). See the subsequent discussion regarding FIG. 3b herein, which illustrates one exemplary system configuration by which such delegation of administrative control can occur.

System Architecture and AP Features—

Figure 3:
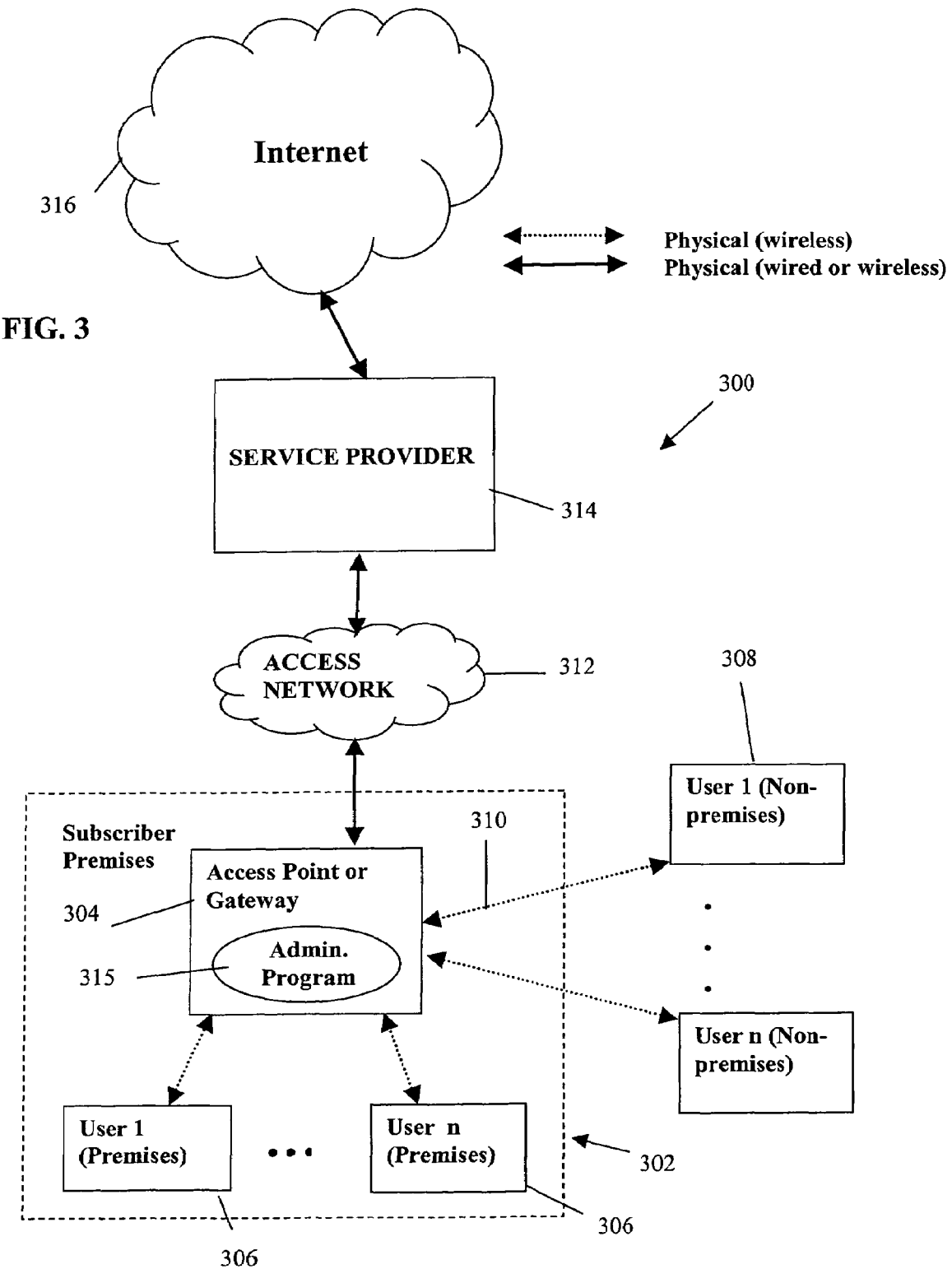
FIG. 3 is a block diagram illustrating a first embodiment of a network architecture employing resource allocation according to the present invention.

Referring now to FIG. 3, one embodiment of the system architecture according to the present invention is described. As shown in FIG. 3, the exemplary architecture 300 comprises a premises (such as a residence or enterprise) 302 having an access point (AP) 304 and a plurality of devices (STAs) 306 in wireless communication therewith. As in FIG. 1, the AP 304 of FIG. 3 acts as a wireless/wired (e.g., 802.11/Ethernet) or wireless/wireless (e.g., 802.11/3G cellular) gateway and router for the premises network, and provides access to external networks such as the Internet 316 via a service provider 314 such as an ISP or cellular service provider (CSP) and an interposed access network 312 (e.g., coaxial cable/HFC, DSL, FTTH, etc.).

As previously described, other users 308 not specifically within the premises 302 may also be in wireless communication with the AP 304, such as where the AP 304 is located nearby and within range of the wireless link of the other users (and vice versa).

The AP 304 of FIG. 3 comprises an administrator program 315 which implements resource allocation policy for the AP 304 based on, inter alia, inputs received from the system administrator or owner. This program comprises in the illustrated embodiment a stand-alone application adapted to run on the AP 304. The application program is controlled via a user interface such as via a display device (not shown) communicating with the AP 304. The AP 304 is also configured with sufficient storage and processor power to accommodate the administrator program.

Figure 3A:
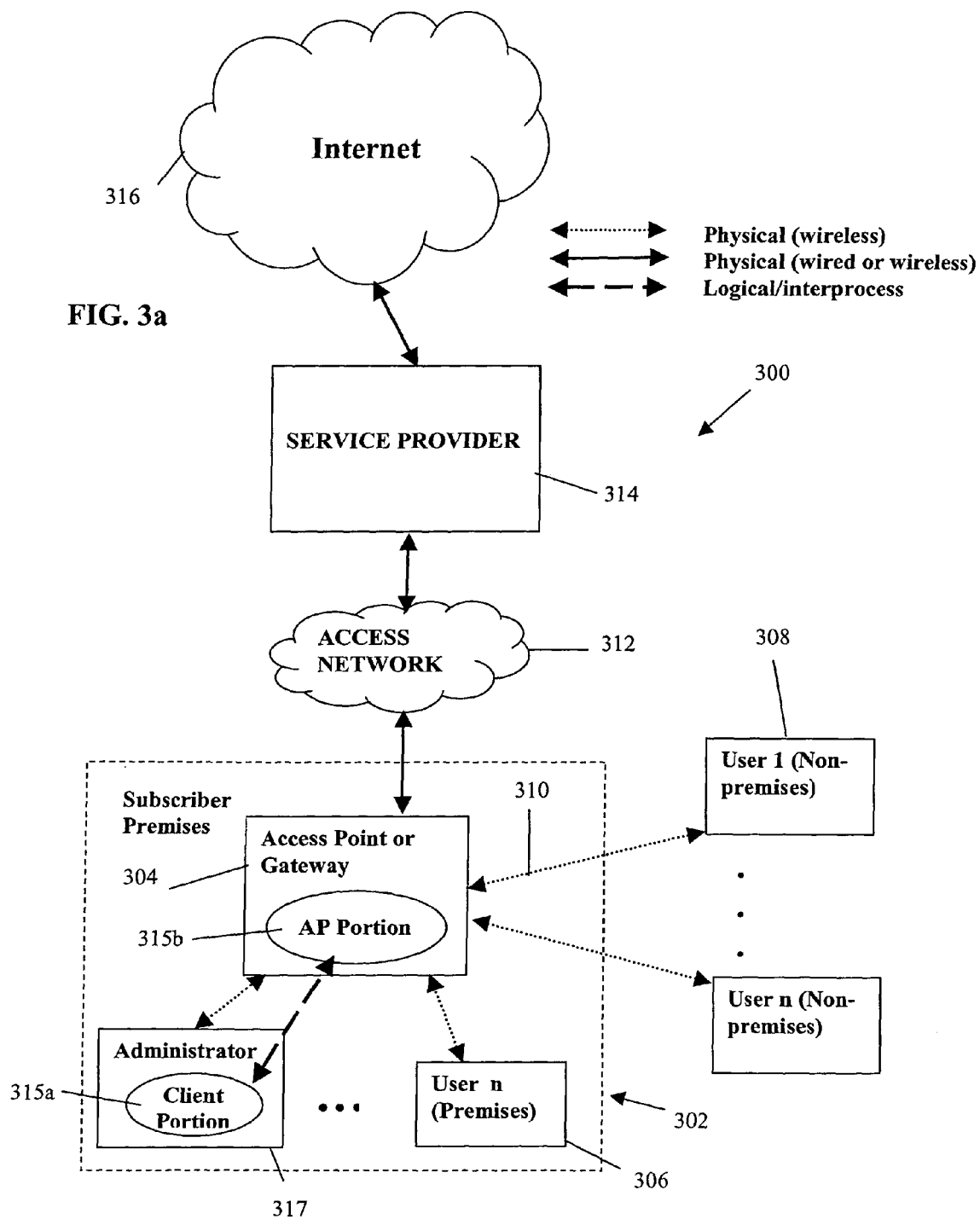
FIG. 3a is a block diagram illustrating a second embodiment of a network architecture employing resource allocation according to the present invention, wherein an administrator terminal is utilized.

Referring now to FIG. 3a, another embodiment of the system comprises a distributed application with a client portion 315a and an AP portion 315b. The client portion 315a is disposed on an administrator terminal or device 317 that is in communication with the AP 304. The administrator terminal may comprise any number of different configurations, including for example a wireless enabled laptop, a desktop PC, a handheld device such as a PDA or smartphone, wireless dongle, etc. The client portion generates a graphical user interface via the indigenous components of the administrator terminal 317; e.g., via its display, and receives inputs from the user (administrator) via the input devices (e.g., mouse, keyboard/keypad, touch screen, speech recognition software, etc.) of the terminal.

Using the embodiment of FIG. 3a, an administrator can implement his/her administrative rules or functions remotely from the AP, only limited by the physical interface between the terminal 317 and the AP 304. For example, if the administrator terminal 317 comprises a PC that has wired or wireless LAN connectivity to the AP, the administrator terminal 317 can be disposed anywhere that has data communication with the LAN. Moreover, it will be appreciated that connectivity by the administrator terminal 317 to the AP 304 can occur via the Internet 316 (and access network 312). So, for example, the remote administrative terminal 317 user can simply gain access to the Internet regardless of their location, and communicate with the AP portion 315b over the Internet (e.g., by knowing its IP address) in order to effect desired changes or input to the AP. In this fashion, the administrator can remotely configure or adjust the operation of the AP at the premises where the AP is located.

FIG. 3b illustrates yet another exemplary embodiment of the system according to the invention. In the embodiment of FIG. 3b, the system 300 comprises each of the components previously described with respect to FIG. 3a, yet with the addition of a second (and third, fourth, etc. if desired) client portion 315c disposed on a non-premises user terminal 308. Each of the client portions 315a, 315c can communicate with the AP portion 315b on the AP either directly (e.g., via an interposed wireless interface between the terminal 317, 308 and the AP 304), or alternatively via another channel such as via the Internet as previously described with respect to FIG. 3a. Administrative and control functions can be shared across the multiple clients if desired, such as via delegation of control functions by the "master" administrative client 315a to the "slave" administrative client(s) 315c.

The exemplary AP (e.g., router or gateway) may also be configured to interact with one or more other APs (whether within the same or a different premises), such as in a chained or cooperative fashion. In one embodiment, the multiple routers/gateways cooperate to become a "virtual" single router/gateway. According to this embodiment, the various bandwidths associated with the several routers/gateways combine or can be allocated to form one total associated bandwidth (albeit associated with different physical channels and e.g., IP addresses; in the exemplary context of WiFi, multiple IP addresses are required for multiple devices (i.e., one per device), but this is not a requirement for practicing the invention). When a desired bandwidth allocation arrangement is set (on the user interface of the administrator computer program), the combined total bandwidth is allocated accordingly. In one variant, one of the multiple routers/gateways is designated a "master" 344 and the rest "slaves" 346, so that resource allocation is controlled by the master 344 and implemented by the slaves (and the master). See FIG. 3c. Specifically, the architecture of FIG. 3c utilizes an administration control program (application) generally similar to that of other embodiments, however further comprising a "master" portion 348a and one or more "slave" portions 348b in process communication therewith. The master portion 348a receives inputs from the administrator/user, and issues communications (e.g., inter-process signaling or messages) to the slave portions 348b which provide data on desired allocation rule implementation, etc.

Figure 3C:
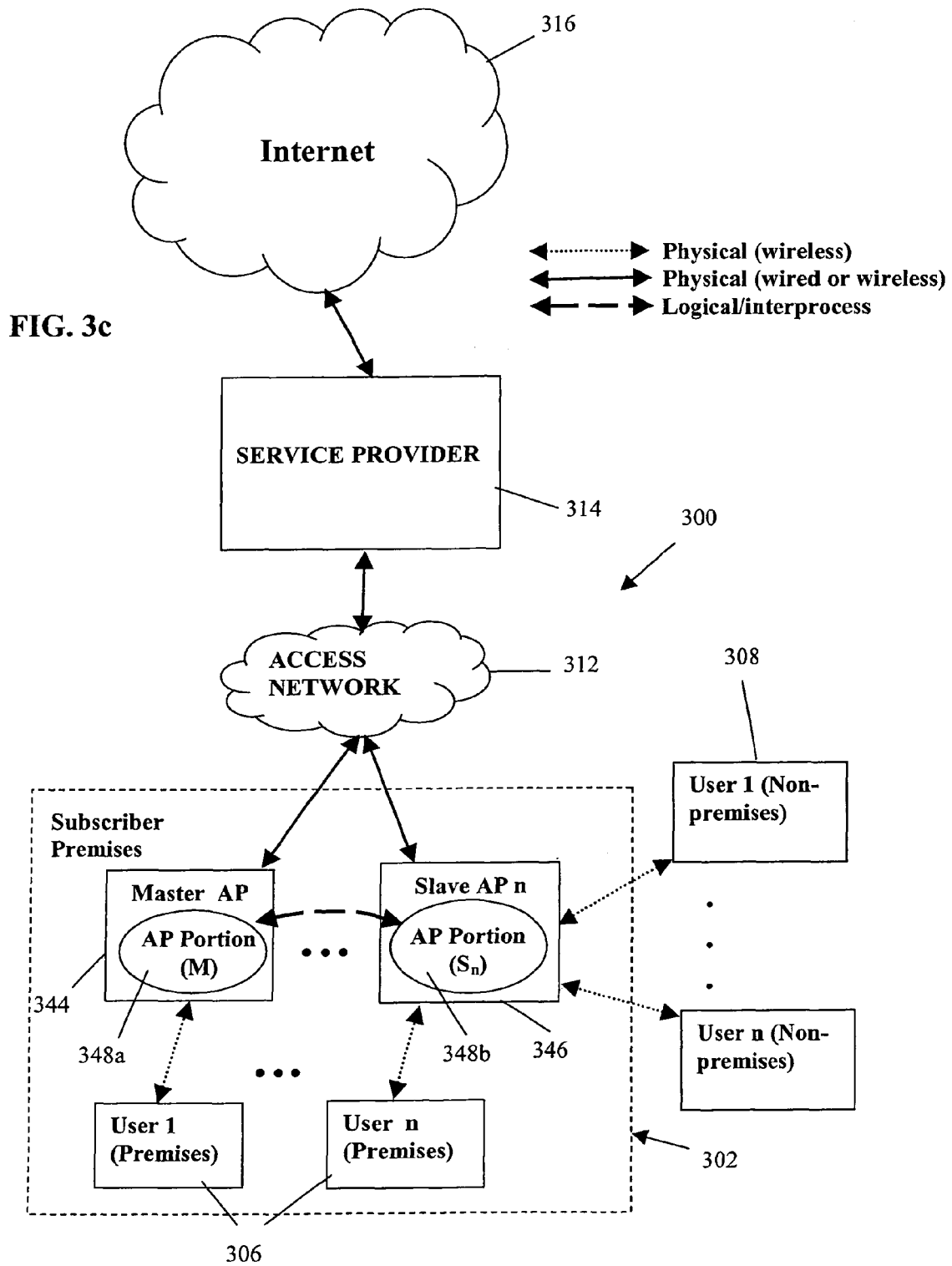
FIG. 3c is a block diagram illustrating a fourth embodiment of a network architecture employing resource allocation according to the present invention, wherein multiple APs associated with the same access network are used in parallel.

It will also be recognized that while FIG. 3c shows the various premises devices 306 (and non-premises devices 308) having wireless access to particular ones of the APs 344, 346, these relationships are arbitrary and merely for purposes of illustration. For example, the system 300 of FIG. 3c can be configured so that any of the terminals 306, 308 can access any of the APs 344, 346 if desired. Alternatively, certain individuals (or classes of individuals) can be restricted to accessing only specific ones of the APs 344, 346.

According to another approach, the multiple routers can divide the available bandwidth or other resource being allocated across each device according to its own allocation scheme (which may be the same or different across the different devices). For example, in a system where there are two routers and an administrator selects that the total bandwidth should be allocated 50:50 between private and public use (or other such basis for differentiation as described herein), each router will dedicate 50% of its bandwidth to public use and 50% of its bandwidth to private use. In such a case, the device-specific allocation is the same (50:50 for each device), or alternatively different (e.g., 60:40 for the first device, and 40:60 for the second device, etc.).

As yet another alternative, the allocation can be across the routers as a whole; e.g., two routers with 100% of the public use on one, and 100% of the private use on the second, etc.

The multiple routers may also be adapted to communicate with each other with regard to current resource (e.g., bandwidth) usage and availability. According to one variant of this embodiment, each router is configured to store and process data regarding the current bandwidth usage and availability of that router. The routers are be configured to communicate this data to the administrator computer program for analysis. According to this embodiment, the administrator may selectively allocate the bandwidth of the various routers individually. However, if the administrator merely establishes a network-wide bandwidth allocation arrangement (as discussed above) the routers will adapt such that the overall bandwidth allocation arrangement is met. In other words, the routers will communicate with each other and make up for routers without enough available bandwidth to dedicate to either public or private use because of their current usage. Because the routers are in at least periodic communication with one another, the routers are able to dynamically correct the compensation amounts when the taxed router is made available again.

For example, in a system where there are three routers and at a specific time one router has dedicated 80% of its available bandwidth to private use, the others are not in use, and an administrator designates a desired overall bandwidth arrangement of 60:40, the desired arrangement would be a 60:40 allocation for each router. However, according to this embodiment, instead the other two routers will compensate and instead affect a 50:50 division which, when combined with the third router's 80:20 current allocation, creates the desired overall 60:40 allocation. Once the third router has freed up enough bandwidth to permit a 60:40 division, this will be communicated to the other routers and they will correct the compensated amounts so that the overall bandwidth is maintained at the administrator desired level. In this fashion, the multiple routers advantageously cooperate such that they may allocate the resources of one another. The administrator may also be informed of the change and the user interface of the administrator computer program updated if desired so as to reflect the new bandwidth allocation arrangement.

The multiple APs (e.g., routers) may also be adapted to cooperate via one "master" device, such as via the architecture shown in FIG. 3c. The master device can be utilized to facilitate and manage communication and bandwidth allocation among the several routers. According to this embodiment, the routers do not communicate with each other, but rather, they each communicate with the master device (which also incorporates the administrator computer program). The master device may act as an AP (e.g., router or gateway) itself, or merely fulfill administrative/control functions for the network.

Figure 3D:
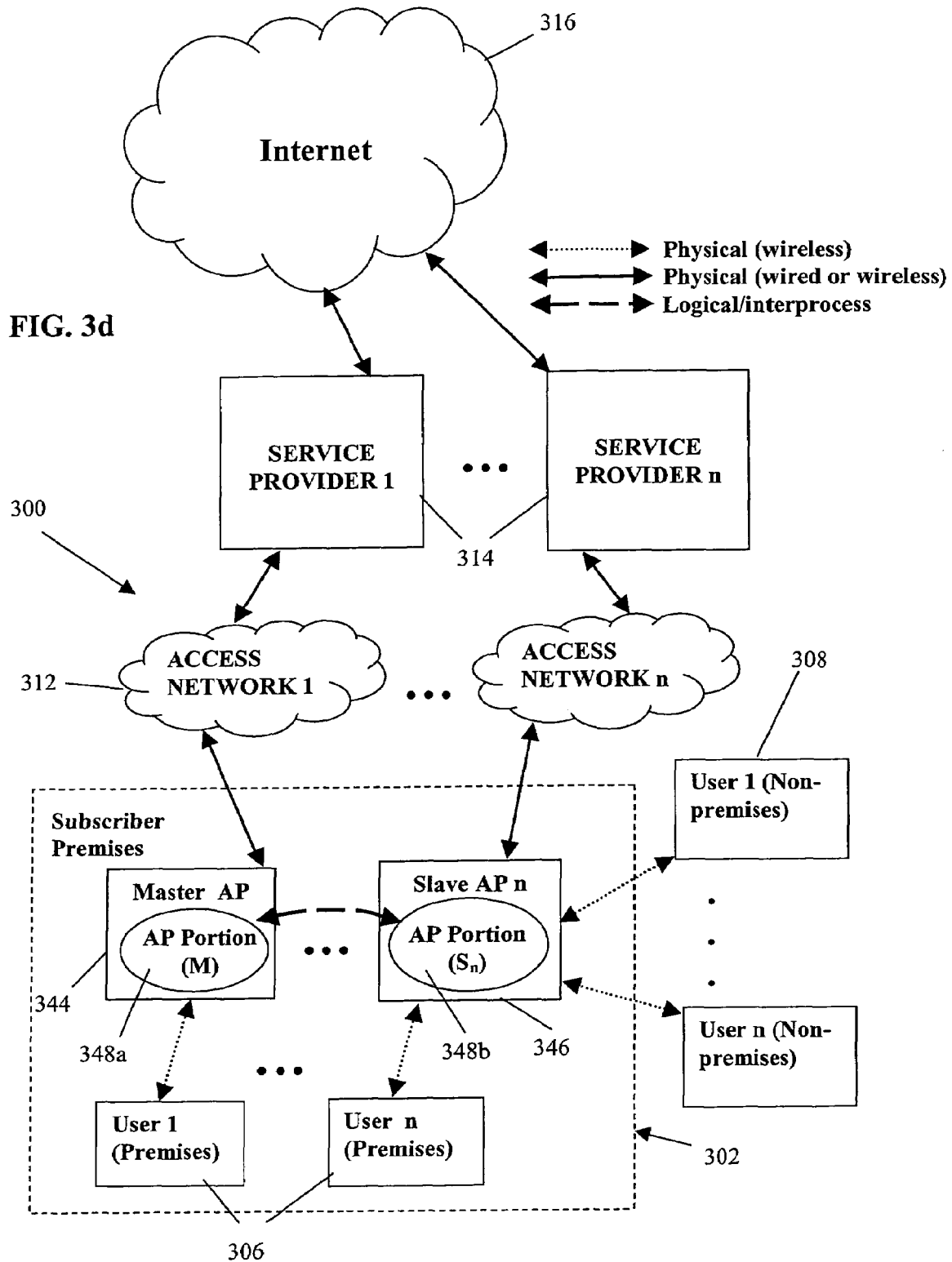
FIG. 3d is a block diagram illustrating a fourth embodiment of a network architecture employing resource allocation according to the present invention, wherein multiple APs associated with different access networks are used.

FIG. 3d illustrates yet another configuration of the system, wherein different service providers (1 . . . n) are used to supply services to different APs. This approach extends the available bandwidth resource for the premises, since two or more connections (each with their own bandwidth) are accessible to the users of the premises. Also, while the embodiment of FIG. 3d shows the 1 . . . n APs being associated with a single premises, this is not a requirement; the different APs (and service providers) might be e.g., associated with different premises.

The AP of any of the foregoing embodiments may also be configured to allocate resources such as bandwidth between secure and non-secure networks such as with Virtual Private Networking (VPN) or IPSec protocol. Thus, the traffic of different user communities over the underlying router network can be separated. For instance, different levels of security or protection can be implemented by different classes of users of the network, and resources allocated accordingly.

One class of users might employ WEP or DES data encryption and protection, whereas another might employ 802.1x and AES, etc. In one embodiment, "private" users are given higher security protection (e.g., privacy, data integrity, and/or authentication), while "public" users are afforded less protection.

The users of the different security levels can be segregated by other classifications as well, such as by range from the AP, "public" versus "private" use (the term "private" use not being necessarily equated with any level of privacy per se, but rather with priority), and so forth.

In another variant, the router/gateway may also be configured to set a radius or range within which a device may wirelessly access a portion of the available bandwidth. The range may be differentiated as between public and private (or any other scheme) such that one or the other has a greater or lesser wirelessly accessible range. For instance, X Mbps or percent of available bandwidth might be reserved for users within a first radius of the AP, while the remaining available bandwidth (total minus X) is allocated for users out to the maximum usable range of the AP. By controlling the population of users within the first radius, the reserved bandwidth will always be available for such users. For instance, if the AP were disposed in a back office of a business, and the radius were set so as to only encompass the "private" or non-customer portions of the business, only company employees would have access to the reserved bandwidth. Conversely, the customers of the business would fall entirely outside the first radius, and therefore be classified as "public" (as would an employee or private user who accessed the AP from the public area). Range determinations between the AP and accessing STA can be performed using any number of different techniques including for example based on signal time delay (e.g., one way or round trip), received signal strength, external means (such as e.g., GPS location, etc.). Similarly, the AP may be programmed to only respond to certain users or device profiles when in range.

In another variant, the router may be configured to be accessed using multiple air interfaces. These may be homogeneous (e.g., two WiFi interfaces), and/or heterogeneous (e.g., a WiFi interface and a WiMAX interface). The various air interfaces may comprise for example any number of technologies including without limitation WiFi (variants of IEEE 802.11 standard), Bluetooth, Ultra-wideband (UWB), WiMAX (IEEE 802.16 standard), wireless PAN (e.g., UEEE 802.15 standard), Wibree (Bluetooth digital radio), and mobile broadband wireless access (Mobile-Fi or 802.20). Different multiple access schemes may also be employed, including e.g., DSSS, OFDM, FHSS, FDMA, TDMA, CSMA/CD, etc.

The exemplary router/gateway may also be configured to allocate the mode by which devices are able to access the bandwidth. For example, the router may determine whether only WiFi is permissible, or only WiMAX, etc. or any combination of modes. This determination may be performed on a per-user or other basis if desired. Moreover, different modes within a single air interface may be allocated by the AP (e.g., data mode versus voice mode, etc.).

Forward and reverse links (channels) within a given air interface may also act as the basis of class differentiation, as may the direction of data transfer. For example, in one variant, the AP is configured to allocate bandwidth or other resources differently between forward and reverse wireless channels, since in many cases the uses of these channels will be somewhat asymmetric in nature. Similarly, a download operation (i.e., from the access network 312 of FIG. 3 to one or more of the user terminals) for example might consume different bandwidth or have different characteristics than an upload (i.e., from user terminal to network 312), and hence require different allocation policies in order to optimize network operation.

In another variant, a frequency spectrum allocation scheme is employed by the managing AP. This may or may not correlate to bandwidth allocation, depending inter alia on the type of air interface employed. For example, a plurality of users in an FDMA system might be allocated different center frequencies and frequency bandwidths by which they can communicate with the AP, with greater frequency bandwidth (which corresponds generally to greater communications bandwidth) being allocated to certain classes of users.

Moreover, channel coding (e.g., forward error correction) schemes associated with one or more air interfaces may be used as the basis of distinction in allocating resources available to the AP. For instance, users employing Turbo coding on their air interface may be allocated to one user class, while users of Viterbi or LDPC (low density parity codes) are allocated to other channels. Certain coding schemes may be more amenable to improving channel performance under certain operating conditions than others (such as ambient noise or interference sources, range from the AP, etc.), and hence it may be desirable to treat these different classes of users differently in terms of resource allocation. Different channel coding schemes may also be associated with different portions of the available frequency spectrum for the AP air interface(s).

Administrator Computer Program—

In another aspect of the invention, a computer program adapted for implementing the aforementioned AP control and administrative functions is disclosed. While certain functional aspects of the resource allocation methodologies of the present invention can be implemented in firmware or even hardware, use of the exemplary administrator application program described herein (or other such software) advantageously enables a broad range of control functions for the administrator/user.

Depending on configuration (see discussion of FIGS. 3-3c herein), the computer program is adapted to detect the presence of at least one AP (e.g., gateway or router) within a network as needed, communicate with the device(s), and direct the allocation of the bandwidth or other resources associated therewith.

The exemplary embodiment of the computer program also comprises a user interface permitting the user to view and interact with any number of different parameters, such as for example the current bandwidth availability of the router(s). The administrator computer program may be run on any device having a storage device (e.g., hard drive) capable of storing the administrator computer program, or having the ability to accept and read a remotely stored copy of the program, and execute the program. As described elsewhere herein, the device on which the administrator program runs may comprise an a wireless phone, PDA, personal computer (PC), a minicomputer, whether desktop, laptop, or otherwise, mobile device such as handheld computer, etc.

The administrator computer program may also be adapted to communicate with the administrator's designated device (i.e., his personal computer or laptop, wireless phone, PDA, etc.) such as to provide updates, permit access to or modify certain features of the user interface, and so forth.

Figure 4:
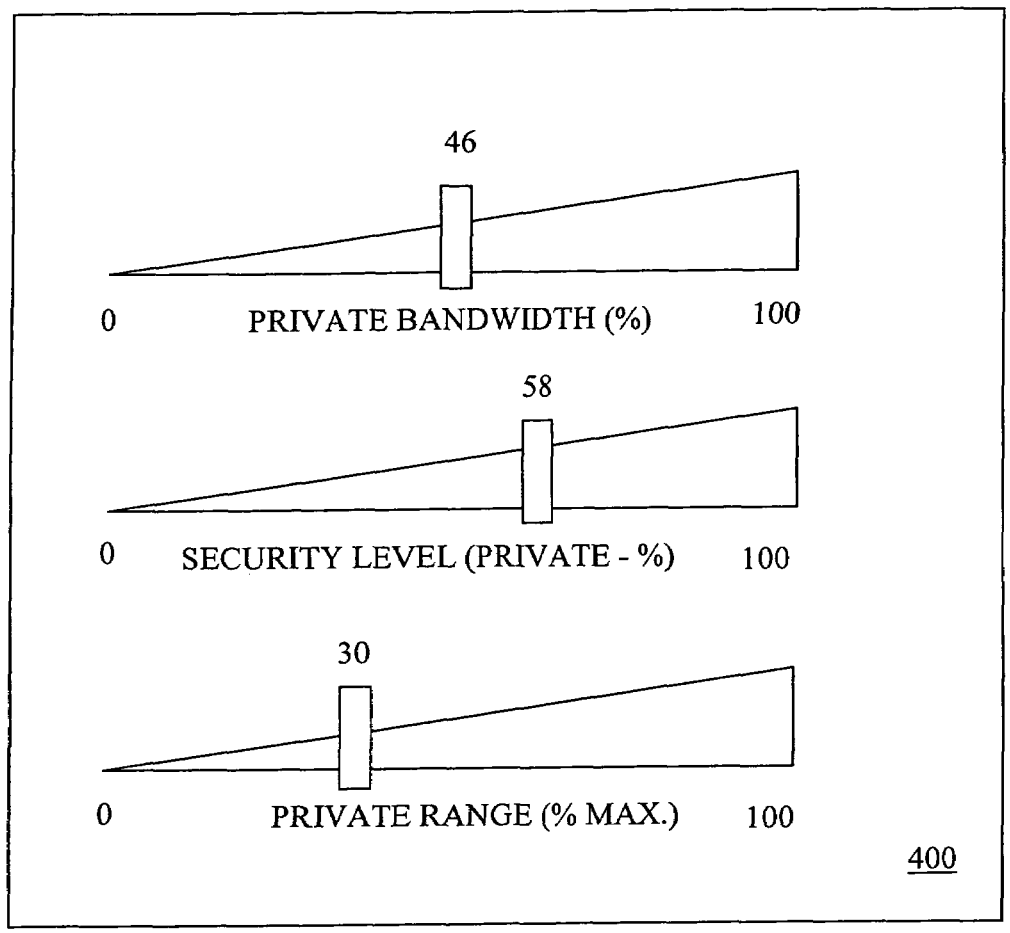
FIG. 4 is a graphical representation of an exemplary user interface for use with the administrator program of the present invention.

In one variant, the aforementioned user interface comprises a GUI of the type well known in the art that allows the administrator or user to allocate a certain percentage of the bandwidth to either public or private use (or based on other distinctions, such as either secure or non-secure use). For example, the user can prompted at startup, or during operation, to enter the bandwidth allocation amounts by entering a numerical amount, moving a software generated slider bar (similar to a volume slider now ubiquitous on PCs), or any number of other such well known graphical mechanisms. It will also be appreciated that the user interface may present the user with controls for a plurality of parameters, such as for secure/non-secure uses within one or more of the aforementioned public/private portions (see e.g., the display 400 of FIG. 4).

The user interface (UI) may also allow the administrator or user to set a radius or range within which a device may wirelessly access a portion of the bandwidth. For instance, in one variant, a single air interface (e.g., WiFi) is configured to differentiate between users at first and second ranges (e.g., X feet from the interface or less for the first range, and >X feet for the second range) as previously described. This can be accomplished through any number of different GUI mechanisms, such as without limitation (i) having the administrator enter a numerical value for X via a keypad, touch screen or the like, (ii) setting a range slider (see FIG. 4 referenced above); (iii) displaying a graphical representation of the AP/router, and a series of radii or rings around it from which the user can select; or (iv) providing the user with a relative frame of reference (e.g., the front door of the business) and allowing them to select range based on this reference (versus an absolute distance), and so forth.

In another variant, the AP (e.g., router or gateway) comprises two or more air interfaces, and a GUI or other user interface is used to allocate a first of the air interfaces entirely to a first range, and another air interface allocated to a second range. For example, the first interface might comprise a shorter range WiFi interface (good out to say 500 feet or so), and the second range a WiMAX interface (good out to several miles or more). One or more other properties of the respective air interfaces might also be more suitable to different types of traffic, and hence selected by the user via the GUI.

In another variant, the administrator program is configured to allow the system administrator to create a predetermined schedule for imposition of one or more allocation rules. For example, at certain times of the day, more or less bandwidth will be allocated to certain uses or classes of users. This approach may be useful where, e.g., the private or priority uses occur during prescribed periods of the day. This approach can also be extended to other time increments such as days of the week (e.g., a first allocation rule imposed on weekdays, and a second rule imposed on Sat., and a third rule imposed on Sunday), months, holiday periods (e.g., "Christmas" rule), etc.

The user interface may also be configured to allow the administrator to vary the range associated with the available bandwidth with the time of day according one or more prescribed rules.

The exemplary embodiment of the user interface also allows the user/administrator to view in real time bandwidth consumption for the different allocation classes or bases (e.g., via a graphical display such as a bar or line chart akin to those ubiquitous in PCs for monitoring CPE and other resource usage). The administrator program may also store such data and allow the user to view and even analyze this historical data for use in, inter alia, constructing new allocation rules going forward. For example, the user in one variant can retrieve via a GUI the bandwidth use information associated with the WiFi AP at their business for the past ten (10) weekends, and analyze this data to determine how bandwidth usage patterns vary as a function of day and time. Historicals or anecdotal data from other sources (e.g., other small businesses of similar ilk, etc.) may be used as bases for creating new rules/policies, or adjusting existing ones.

The administrator computer program may also allow the administrator or user to save bandwidth allocation arrangements or rules for subsequent use. The administrator, may, for example set a specific bandwidth arrangement for hours when there is a relatively small need for one particular use. The administrator may save those settings under a title which will appear on the user interface (e.g., "Christmas") to remind the administrator of the type of settings or the situations to which they apply. A pop-up window or other graphical interface mechanism may also be used to summarize the parameters of the rule(s); e.g., when the user rolls over the title with a mouse cursor or their finger on a touch screen, etc., a small window is generated on the display to permit the user to perceive the settings "at a glance".

As previously referenced, another embodiment of the administrator computer program provides the administrator with the option of allowing the bandwidth allocation computer program to automatically allocate bandwidth between different uses, via an allocation algorithm. This algorithm may, for example, monitor instantaneous bandwidth consumption by the different classes of use, as well as types of uses requested or being delivered (e.g., high-bandwidth media streaming versus low-bandwidth Internet browsing), and make an allocation based thereon.

As another example, an S-minute moving average of instantaneous bandwidth for a give use/class (or multiple averages for multiple uses/classes) is used to determine allocation; as user or class bandwidth changes over time, the moving average will lag somewhat, yet be generally representative of the current trend in overall resource consumption. The algorithm then uses this data to adjust the allocation.

In yet another embodiment (not shown), the controller or administrator program may employ a statistical algorithm for allocating resources. For instance, in one embodiment, a statistical "multiplexing" algorithm is employed via, e.g., a computer program running on the controller that allocates available resources according to a statistical distribution. As is well know, statistical multiplexing allows for inter alia the servicing of multiple channels of "demand" whose peaks may, if considered collectively, exceed the total capacity of the system, but when considered on a statistical basis, do not exceed such capacity. Hence, the instantaneous bandwidth requirement profiles of individual devices may vary significantly over time, yet when considered in the statistical aggregate, they do not exceed the bandwidth-providing capability of the source(s), or only do so on limited occasions.

The foregoing statistical approach is typically suited to larger numbers of users, since the statistics of the "pool" become better as the number increases. In that users on the "public" portion may be very transient, and the bandwidth requirements of all users (public or private) may be highly variable, the foregoing statistical approach can make use of these changes most efficiently when several users are vying for resources on the router/gateway. In one variant of the invention, instantaneous bandwidth demand profiles for the devices are monitored, and optionally used as inputs to the statistical algorithm for allocating bandwidth as a function of time. In this fashion, the allocation is dynamic and adaptive to changing statistics for the individual users. Other statistical approaches may be used with equal success as well.

In cases where the resource constraints are so great so as to deny service or fail to meet minimum quality or other requirements for the public users, notification mechanisms may be used to notify these users that either service is being denied (e.g., they cannot associate with a given AP), or that service will be delayed (e.g., provided on an as-available basis). To this end, the public user client devices (e.g., laptops or handhelds) can be configured with a client application that communicates with the administrator program and further manages tasks on the client device so as to optimize use of the available resource. For example, if a client device requires a minimum of X Mbps to complete a pending task or request, and only some amount less than X Mbps is currently available, the client device client application may "reshuffle" the processing order of two or more pending tasks so that those which can be immediately serviced (e.g., sending e-mail, etc.) are given head-of-the-line privilege until sufficient bandwidth is available for the other tasks. This approach avoids a resource-intensive task from blocking processing of other less resource intensive tasks.

In another embodiment of the invention, the aforementioned administrator program is configured to include functionality that permits "intelligent" and dynamic naming, and/or relationships to be assigned to various functions within the administrator program.

In one variant, as the AP or base station is reconfigured (e.g., by a network administrator or operator, or even automatically by the device itself), the name or other descriptive information assigned to that device changes automatically as well, thereby advantageously having to relieve the operator from doing so manually. Parameters associated with the device or subsets of its functions may also be changed simultaneously. For example, a parameter table or other such data structure containing data describing an AP's properties such as public/private bandwidth allocation, type of security, QoS, authentication protocols, etc. may be maintained within the AP (or a proxy device responsible for maintaining configuration information for the AP). As the functionality of the AP is changed (e.g., bandwidth allocation between "public" and "private" uses revised by the administrator), the information in the parameter table will change automatically. This parameter table can be made human- and/or machine-readable as desired, so as to support for example use of the changed information in another application program running on the AP or administrator platform.

For instance, in one variant, the parameter table data is generated as part of a GUI roll-over window (i.e., a window that pops up on a display when an icon or other region of interest is rolled over by a mouse cursor or upon receipt of another input command). The window displays the relevant parametric information for the AP, and disappears automatically when the roll-over is completed. Such functionality might exist for example via the aforementioned administrator program running on the AP, or an AP management application resident on the administrator's PC. The local network topology is displayed as a set of symbols or icons, and as the icon representing the AP of interest is rolled over, a pop-up window is generated including the relevant parameters for that AP. In this fashion, the user/administrator can view the status and configuration of the AP at a glance without further action.

In another variant, concatenated or composite naming protocols are implemented which may also be dynamically changed by the administrator program as AP configuration or status changes. For example, a given AP might be named "BS1" (for base station No. 1), to which various configuration/status information may be appended (e.g., "BS1—12% private—88% public—no QoS—AES encryption" or the like). Alternatively, the name might include a concatenated code or other such information which encapsulates more information than can be readily displayed as part of the name (e.g., "BS1—profile A", wherein "profile A" refers to a stored list or table of parametric information which the user can access if desired, such as via a hyperlink or other relational mechanism of the type well known in the computer programming arts). As with other embodiments described herein, such concatenated or composite naming conventions may also be human- and/or machine-readable as desired.

It will also be recognized that the name of the device (e.g., AP or base station) may also be dynamically varied as configuration changes. For instance, one naming scheme of an AP might be to act as a secure gateway or AP, with a corresponding name such as "Secure AP No. 1". If the configuration of that device is then changed to be non-secure for instance, the exemplary administrator program of the invention can automatically change the name (as well as the associated configuration table or concatenated parametric description as previously discussed) to reflect the new configuration, such as by renaming the same AP to "Non-Secure AP No. 1" or the like. Likewise, as network topography changes, the relative or absolute naming scheme for the AP might change (e.g., when a new AP is added, what was previously "AP No. 1" might become "AP No. 2", and so forth. Myriad other variations of the foregoing automatic update/renaming functionality will be recognized by those of ordinary skill given the present disclosure.

In another variant, naming/relationship assignment can be performed by the software developer at the time of development/manufacture, such as where e.g., the administrator software running on an AP includes a menu or other GUI with (i) multiple predetermined choices for different names or labels to apply to various "slices" of the AP resource being allocated (e.g., bandwidth); and optionally (ii) relational links or classifications that permit certain logical associations to be formed between two or more named "slices" or functions associated with the AP.

The aforementioned use of naming permits, inter alia, rapid and easy user association with the function/slice being selected with a task or application to be performed, and automatic updating of parameters associated with named functions or entities. For example, one slice of an available resource (e.g., bandwidth) may be named "secure communications", which alerts the user that data or VoIP communications requiring some level of security should be routed over this slice of the bandwidth. The named slice can also have different types of applications automatically associated with it; e.g., all VPN communications are automatically routed over the "secure" slice of bandwidth, all SMS or text messages are routed over the "public" slice, etc.

So, as simple example, an AP with public and private allocations of bandwidth available may present the user with a GUI or similar mechanism (e.g., pulldown menu, interactive icon, etc.), whereby the user can simply select the appropriate application type; for example, "public" for public uses, and "private" for private uses, with one or more predetermined rules (e.g., regarding how much of the total bandwidth is assigned to public versus private, what security rules (if any) apply to each, etc.) then being applied to configure the AP in accordance with these uses. Other exemplary application categories might include for example "video" and "low-bandwidth data" (i.e., where the user is sending SMS or text messages, WAP pushes, etc.). Categorization may also be along the lines of functional capabilities; e.g., "QoS" and "No QoS", "encryption type A" or "encryption type B", "secure" and "non-secure", etc. Myriad other applications will be recognized by those of ordinary skill.

The aforementioned optional assignment of relationships or associations allows the developer or user to optionally correlate or associate certain functions or categorizations with others. As a simple example, the aforementioned "encryption type A" and "encryption type B" selections would be associated by the software developer with the "secure" functional mode of operation. This approach allows the software to recognize conflicting selections (and conversely, required related selections). It also allows for the logical aggregation of functional "ensembles"; e.g., the aforementioned "secure" mode of operation may have associated with it and ensemble of other functional requirements (e.g., AES encryption, 802.1x authentication, generation of public/private encryption key pairs, generation of a cryptographic hash (residue), etc.). By selecting the "secure" mode, these other functional requirements or specification may be automatically (or manually) invoked so as to meet the requirements of the overall security policy associated with the "secure mode".

Accordingly, in one variant of the invention, users can name and create their own customized functional specifications similar to the secure-mode example discussed above. For instance, the user might call their function "John's function", which has associated with it designated public/private bandwidth allocation, and within those sub-allocations for different types of functional requirements (e.g., private secure/non-secure, public high/low bandwidth, etc.). Other combinations will be recognized by those of ordinary skill given the present disclosure.

In another embodiment, the user is given the opportunity to create his/her own naming conventions, classifications, etc., along with some degree of configurability of the administrator program for implementing these conventions/classifications. For example, a user might associate an attribute that is important for their particular use with the selected name, and construct a particular allocation scheme, function, or ensemble of associated functions using e.g., a development tool or environment that is part of the larger administrator program (or as a stand-alone software tool), much akin to writing macrofunctions in conventional software.

Naming can also be on a per-user or per user class basis. For instance, a first subset of classifications may be available to one user, while a second set of classifications (which may or may not overlap with the first user's set) are available to a second user, and so forth.

It will be appreciated that while the primary embodiments discussed herein are described in terms of bandwidth allocation, other resources (whether alone or in combination with bandwidth) may be allocated according to the methods and apparatus of the present invention. For example, security (including without limitation integrity protection, authentication, and privacy) can be considered to be resources that can be allocated based on, e.g., the need for one or more of such mechanisms according to the traffic type or operation(s) being performed. For instance, certain types of traffic may be, as a class, in need of high levels of protection due to their nature (e.g., personal or credit card data, etc.), while others such as streaming video from a public website (e.g., You-Tube) carry few if any security requirements, since their interruption, loss of privacy, or loss of integrity have few if any repercussions other than perhaps loss of user satisfaction. Accordingly, if an AP in use according to the present invention has restricted security processing capability, a limited number of secure sockets, etc., then these can be allocated to the user applications most in need of them at any given time.

Similarly, QoS can be allocated as a resource, such as where either (i) a certain minimum bandwidth is required to support required QoS features, or (ii) only certain channels available to the AP are suitable for QoS applications.

Administrator Device—

Although, as described above, the administrator computer program may be run on any number of devices (or the logic rendered as hardware and/or firmware if desired), another aspect of the invention discloses an administrator device; see, for example, the exemplary system architectures of FIG. 3a, wherein an administrator device 317 is employed. This device may be specifically adapted to run the administrator computer program or portions thereof (as shown in FIG. 3a), or alternatively may comprise a less capable controller which merely controls functions that are implemented on the AP 304 itself.

One embodiment of the administrator device according to the invention comprises a simple IR or RF remote control device, which allows the user to insert commands to their router/gateway via the IR or RF interface and logic (e.g., an FPGA, ASIC or other integrated circuit) resident in the router/gateway, such as switching between various predetermined allocation modes, changing device settings, powering up or down, etc. This approach has the advantage of relative simplicity and low cost, but accordingly provides the user with only a very limited set of functions in terms of resource allocation and control, since the administrator control program is not resident on the device 317, but rather only on the AP(s) being managed.

In another variant, the remote device is in communication with a control module on the router/gateway (or otherwise communicating therewith), the control module being adapted to run the aforementioned computer program. This approach provides somewhat greater flexibility (by virtue of a more capable controller with enhanced administrator program functionality), yet is still somewhat limited based on the capacity of the remote unit.

In yet another variant, the administrator device comprises a mobile computerized client device (e.g., a personal, handheld device such as a smartphone or PDA, laptop computer, etc.) having an internal storage device (e.g., hard drive, program memory, etc.), wherein the administrator computer program resides, and a processor to execute the program. The administrator device also comprises a display, a series of keys or other functional inputs such as a touch screen, mouse or joystick, soft function keys (SFKs), fixed function keys (FFKs), or combinations of the foregoing, and an interface enabling communication with the router(s)/gateway(s), either wired or wirelessly. See, e.g., the exemplary configuration of FIG. 3a. The computerized device generates the user interface (e.g., GUI or touch display) on the display device, thereby allowing the administrator to enter commands and information. The administrator program then generates messaging or signaling which is transmitted to the target router or gateway via the aforementioned interface (e.g., short-range Bluetooth, PAN, Ethernet, FireWire (IEEE Std. 1394), USB, etc. interface), with the target router/gateway implementing the administrator directives.

In still another variant, the administrator device comprises a desktop or laptop PC with wired or wireless connectivity to the AP. For example, one exemplary embodiment utilizes a WiFi-enabled laptop computer with the administrator client portion 315a (see FIG. 3a) running thereon to communicate with the AP portion 315b over the WiFi interface itself. The exemplary client portion 315a is configured to obtain appropriate user authorizations and credentials so as to frustrate surreptitious access to the administration control functions. Standard security mechanisms normally associated with WiFi links such as WEP, WEP2, 802.1x, etc. may be used to provide data integrity, confidentiality, authentication, etc. as well.

As previously noted, the administrator device 317 may also be remote from the AP(s) being managed, and accordingly may communicate with the APs via other communication channels (such as via the Internet 316).

Business Methodologies—

In another aspect, exemplary embodiments of business methodologies related to the present invention are now described.

For example, as previously discussed, the router/gateway may be configured to allocate between public or private use. It is through this mechanism, for example, that a proprietor may establish a portion of the router's bandwidth strictly for business-related use ("private" use) and a portion for the use of his/her patrons ("public" use). As is well known, the proprietor may provide this service to patrons for free, or alternatively charge the patrons for this access. Similarly, the proprietor may receive remuneration from a service provider for having his/her patrons access the Internet or other resources via the service provider's connection, such as on a per-minute or per-connection basis.

In another business model, the proprietor or service provider may differentiate their rates for access based on the type or class of service provided; e.g., secure versus non-secure (or less secure), short-range versus long-range, peak versus off-peak, etc. For example, during a very crowded morning or lunch period in the proprietor's restaurant or coffee shop, available bandwidth may be at a premium, and the demand may exceed availability capacity. Hence, "head-of-the-line" or similar privileges can be selectively granted to certain customers (e.g., regular customers, those paying extra, etc.) so as to assure access. Customers might even pay a monthly or annual fee so as to assure that they will always have X Mbps of available bandwidth. This can be accomplished through any number of mechanisms, such as the pre-paid user swiping a magnetic strip card, RFID tag, or even simply by virtue of identifying information associated with their laptop or other client device (e.g., iPhone™) that will be accessing the hotspot. For instance, a simple password-based login or the like could be employed to permit certain users to gain access to bandwidth that has been reserved under a pre-payment plan or other such arrangement.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for allocating a collective bandwidth of a plurality of wireless access points, the method comprising:

at a first wireless access point of the plurality of wireless access points:

receiving a request for a first use from a wireless client device;

in response to receiving the request for the first use, allocating a first portion of the collective bandwidth to the first use based on at least one bandwidth allocation rule that is dynamically set and implements in part a bandwidth allocation of the collective bandwidth;

allocating a second portion of the collective bandwidth to a second use different from the first use based on the at least one bandwidth allocation rule; and servicing the request for the first use using the first portion of the collective bandwidth, wherein the bandwidth allocation of the collective bandwidth comprises comprising at least a first subset of the collective bandwidth allocated to the first use and a second subset of the collective bandwidth allocated to the second use, and wherein each of the plurality of wireless access points dynamically allocates one or more portions of the collective bandwidth to at least the first use or the second use based on one or more allocation bandwidth rules to maintain the bandwidth allocation of the collective bandwidth.

2. The method of claim 1, wherein the first wireless access point communicates with one or more wireless client devices in accordance with an IEEE 802.11 standard.

3. The method of claim 1, wherein the first wireless access point services requests for the first use and the second use using different wireless air interfaces respectively.

4. The method of claim 3, wherein one of the different wireless air interfaces comprises a Wi-Fi interface, and a second of the different wireless air interfaces comprises a WiMAX interface.

5. The method of claim 1, wherein the first use and second use are associated with different frequency bands.

6. The method of claim 1, further comprising:

receiving, from a second wireless access point, a bandwidth usage status of the second wireless access point and adjusting the at least one bandwidth allocation rule based on the bandwidth usage status of the second wireless access point.

7. The method of claim 1, further comprising sending, to a second wireless access point, a bandwidth usage status of the first wireless access point.

8. The method of claim 7, wherein sending the bandwidth usage status of the first wireless access point to the second wireless access point causes a change in bandwidth allocation at the second wireless access point.

9. The method of claim 1, wherein the first access point allocates the first portion of the collective bandwidth in a forward link.

10. The method of claim 1, wherein the first access point allocates the first portion of the collective bandwidth in a reverse link.

11. The method of claim 1, wherein the at least one bandwidth allocation rule is dynamically set by one of the following: a remote client device, an administrative network entity, and a second wireless access point of the plurality of wireless access points.

12. An apparatus suitable for allocating bandwidth to at least a first use and a second use different from the first use, the apparatus comprising:

a wireless interface configured to communicate with one or more wireless client devices, the wireless interface having a bandwidth associated therewith;

a processor; and a storage device configured to store computer readable instructions that, when executed by the processor, cause the apparatus to:

access at least one bandwidth allocation rule stored at the apparatus, the at least one bandwidth allocation rule implementing in part an overall bandwidth allocation for a collective bandwidth, wherein the overall bandwidth allocation comprises at least a first subset of the collective bandwidth allocated to the first use and a second subset of the collective bandwidth allocated to the second use, allocate a first portion of the collective bandwidth to the first use in accordance with the at least one bandwidth allocation rule, and allocate a second portion of the collective bandwidth to the second use in accordance with the at least one bandwidth allocation rule, wherein the collective bandwidth comprises the bandwidth associated with the wireless interface and a bandwidth associated with at least one other apparatus that allocates a third portion of the collective bandwidth to the first use or the second use based on one or more bandwidth allocation rules, and the apparatus and the at least one other apparatus cooperate to allocate the collective bandwidth in accordance with the overall bandwidth allocation.

13. The apparatus of claim 12, wherein the first use comprises a secure use, and the second use comprises a non-secure use.

14. The apparatus of claim 12, wherein the first use is carried out using a first encryption type, and the second use is carried out using a second encryption type.

15. The apparatus of claim 12, wherein the first use is carried out in accordance with a virtual private network (VPN) protocol or in accordance with an Internet Protocol Security (IPSec) protocol.

16. The apparatus of claim 12, further comprising a user interface configured to receive user input for modifying the at least one bandwidth allocation rule or for modifying the overall bandwidth allocation of the collective bandwidth.

17. The apparatus of claim 12, wherein the apparatus cooperates with the at least one other apparatus to allocate the collective bandwidth by receiving instructions from the at least one other apparatus and modifying the at least one bandwidth allocation rule stored at the apparatus based on the received instructions.

18. The apparatus of claim 17, wherein the instructions, when executed by the processor, further cause the apparatus to change, based on the modified at least one bandwidth allocation rule, an allocation of the collective bandwidth to the first use or an allocation of the collective bandwidth to the second use.

19. The apparatus of claim 12, wherein the apparatus cooperates with the at least one other apparatus to allocate the collective bandwidth by sending instructions to the at least one other apparatus that causes the at least one other apparatus to change the one or more bandwidth allocation rules.

20. The apparatus of claim 12, wherein the at least one bandwidth allocation rule is different from at least one of the one or more bandwidth allocation rules.

21. A method for allocating a collective bandwidth of a plurality of wireless access points, the method comprising:
at a wireless access point of the plurality of wireless access points:
receiving at least one bandwidth allocation rule from an administrative entity, the at least one bandwidth allocation rule implementing in part an overall bandwidth allocation of the collective bandwidth, wherein the overall bandwidth allocation comprises at least a first subset of the collective bandwidth allocated to a first use and a second subset of the collective bandwidth allocated to a second use different from the first use,
receiving a plurality of requests for services from one or more wireless client devices;
prioritizing the plurality of requests for services in accordance with the at least one bandwidth allocation rule, the prioritization based on a type of use associated with each of the plurality of requests;
allocating a first portion of the collective bandwidth to a first request of the plurality of requests based on a first priority associated with the first request, the first request being for the first use;
allocating a second portion of the collective bandwidth to a second request of the plurality of requests based on a second priority associated with the second request, the second request being for the second use, and
wherein one or more other wireless access points of the plurality of wireless access points allocate one or more portions of the collective bandwidth to the first use or the second use based on one or more bandwidth allocation rules, and at least the wireless access point and the one or more other wireless access points dynamically allocate bandwidth to maintain the overall bandwidth allocation of the collective bandwidth.

22. The method of claim 21, wherein the first request is for a first service carried out in accordance with a private use and the second request is for a second service carried out in accordance with a public use.

23. The method of claim 21, wherein the first request is received via a first wireless interface of the wireless access point and the second request is received via a second wireless interface of the wireless access point, the second wireless interface different from the first wireless interface.

24. The method of claim 21, wherein the at least one bandwidth allocation rule is based on an available bandwidth associated with another wireless access point of the plurality of wireless access points.

25. The method of claim 21, wherein the at least one bandwidth allocation rule is based on security.

26. The method of claim 21, wherein the at least one bandwidth allocation rule is based on a time of day.

27. A non-transitory computer readable storage medium configured to store instructions that, when executed by a processor in a wireless access point, cause the wireless access point to:
receive, from a remote apparatus, at least one bandwidth allocation rule that implements in part an overall bandwidth allocation of a collective bandwidth, the overall bandwidth allocation comprising at least a first subset of the collective bandwidth allocated to a first use and a second subset of the collective bandwidth allocated to a second use different from the first use,
receive a first request for the first use from a wireless client device;
in response to receiving the first request for the first use, allocate a first portion of the collective bandwidth to the first use based on the at least one bandwidth allocation rule;
allocate a second portion of the collective bandwidth to the second use based on the at least one bandwidth allocation rule; and
service the first request for the first use using the first portion of the collective bandwidth, and
wherein the collective bandwidth comprises a bandwidth of the wireless access point and a bandwidth of at least one other wireless access point that allocates a third portion of the collective bandwidth to the first use or the second use based on one or more bandwidth allocation rules, and the wireless access point and the at least one other wireless access point cooperate to allocate the collective bandwidth in accordance with the overall bandwidth allocation.

28. The non-transitory computer readable storage medium of claim 27, wherein the instructions, when executed by the processor, further cause the wireless access point to detect a change in bandwidth usage for the first use and in response to detecting the change, increase or decrease the first portion of the collective bandwidth allocated to the first use.

29. The non-transitory computer readable storage medium of claim 28, wherein the change in bandwidth usage for the first use comprises receiving, from one or more wireless client devices, a second request for the first use at the wireless access point.

30. A system for allocating a collective bandwidth of a plurality of wireless access points for at least a first use and a second use different from the first use, the system comprising:
a first wireless access point of the plurality of wireless access points, the first wireless access point configured to:
wirelessly communicate with one or more wireless devices,
receive data relating to one or more bandwidth allocation rules implementing an overall bandwidth allocation for the collective bandwidth, the overall bandwidth allocation comprising at least a first subset of the collective bandwidth allocated to the first use and a second subset of the collective bandwidth allocated to the second use,
dynamically allocate a first portion of the collective bandwidth to the first use,
dynamically allocate a second portion of the collective bandwidth to the second use, and
send bandwidth allocation instructions to one or more wireless access points of the plurality of wireless access points; and
a second wireless access point of the plurality of wireless access points, the second wireless access point configured to:
wirelessly communicate with the one or more wireless devices,
receive the bandwidth allocation instructions from the first wireless access point, and
dynamically allocate a third portion of the collective bandwidth to the first use or the second use based on the bandwidth allocation instructions,
wherein the plurality of wireless access points cooperate to dynamically allocate the collective bandwidth to maintain the overall bandwidth allocation of the collective bandwidth.

31. The system of claim 30, wherein sending bandwidth allocation instructions to the one or more wireless access points comprises sending the bandwidth allocation instructions to the second wireless access point, and wherein the first wireless access point sends the bandwidth allocation instructions to the second wireless access point in response to a change in available bandwidth that occurs at the first wireless access point.

32. The system of claim 30, wherein the first wireless access point is further configured to:
- receive a bandwidth usage report from at least one of the plurality of wireless access points,
- determine whether a change in an allocation of the collective bandwidth is required, and send the bandwidth allocation instructions to the one or more wireless access points in response to determining the change in the allocation of the collective bandwidth is required, wherein sending the bandwidth allocation instructions causes the change in the allocation of the collective bandwidth at the one or more wireless access points.

33. The system of claim 32, wherein the bandwidth allocation instructions are derived in part by available bandwidth of the at least one of the plurality of wireless access points.

34. The system of claim 30, wherein the plurality of wireless access points cooperate to maintain the overall bandwidth allocation of the collective bandwidth by exchanging one or more bandwidth usage reports that cause at least one of the plurality of wireless access points to modify an allocation of the collective bandwidth to the first use or to the second use.

* * * * *

UNITED STATES PATENT AND TRADEMARK OFFICE
CERTIFICATE OF CORRECTION

PATENT NO. : 8,854,966 B2  
APPLICATION NO. : 12/008623  
DATED : October 7, 2014  
INVENTOR(S) : Anthony M. Fadell Page 1 of 1

It is certified that error appears in the above-identified patent and that said Letters Patent is hereby corrected as shown below:

In the Claims:

Column 27, line 18 (Claim 1, line 18): "comprises comprising at least" should read --comprises at least--.

Column 27, lines 24-25 (Claim 1, lines 24-25): "allocation bandwith rules" should read --bandwith allocation rules--.

Column 31, line 20 (Claim 33, line 2): "available bandwith" should read --an available bandwith--.

Signed and Sealed this  
Sixteenth Day of December, 2014

Michelle K. Lee  
*Deputy Director of the United States Patent and Trademark Office*